(12) United States Patent
Nakatani

(10) Patent No.: US 12,278,934 B2
(45) Date of Patent: Apr. 15, 2025

(54) INFORMATION PROCESSING APPARATUS, INFORMATION PROCESSING SYSTEM, INFORMATION PROCESSING METHOD, AND NON-TRANSITORY RECORDING MEDIUM

(71) Applicant: Yasuhito Nakatani, Kanagawa (JP)

(72) Inventor: Yasuhito Nakatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/428,448

(22) Filed: Jan. 31, 2024

(65) Prior Publication Data

US 2024/0380855 A1 Nov. 14, 2024

(30) Foreign Application Priority Data

Mar. 20, 2023 (JP) .................. 2023-043951

(51) Int. Cl.
*H04N 1/00* (2006.01)
*H04N 23/63* (2023.01)

(52) U.S. Cl.
CPC ..... *H04N 1/00798* (2013.01); *H04N 1/00334* (2013.01); *H04N 1/00342* (2013.01); *H04N 23/633* (2023.01)

(58) Field of Classification Search
CPC ........... H04N 1/00798; H04N 1/00334; H04N 1/00342; H04N 23/633
USPC .................................................. 358/1.1–1.18
See application file for complete search history.

(56) References Cited

U.S. PATENT DOCUMENTS

| 10,063,728 | B2* | 8/2018 | Yoshizaki | .......... H04N 1/00822 |
| 2014/0333948 | A1* | 11/2014 | Hashimoto | ........ H04N 1/00278 |
| | | | | 358/1.13 |
| 2016/0247323 | A1 | 8/2016 | Shimazaki | |
| 2017/0180581 | A1* | 6/2017 | Yoshizaki | .......... H04N 1/00822 |
| 2017/0272604 | A1 | 9/2017 | Nakatani | |
| 2022/0329705 | A1 | 10/2022 | Nakatani et al. | |

FOREIGN PATENT DOCUMENTS

| JP | 2016-039567 A | 3/2016 |
| JP | 2016-158108 A | 9/2016 |
| JP | 2020-087249 A | 6/2020 |

* cited by examiner

*Primary Examiner* — Gabriel I Garcia

(74) *Attorney, Agent, or Firm* — Harness, Dickey & Pierce, P.L.C.

(57) ABSTRACT

An information processing apparatus includes an image sensor and circuitry. The image sensor captures an image of an automatic document feeder of an image reading apparatus with a document set on the automatic document feeder. The circuitry acquires information related to the automatic document feeder from an information medium placed on the image reading apparatus. Based on the captured image of the automatic document feeder and the acquired information, the circuitry estimates setting information of a reading operation performed by the image reading apparatus, and instructs the image reading apparatus to perform the reading operation on the document based on the estimated setting information.

12 Claims, 15 Drawing Sheets

```
{
"ipaddress":"10.60.100.100",
"machine_name":"ABC-PR",
"adf_width":450,
"adf_depth":350,
"adf_direction":"vertical"
}
```

DOCUMENT ORIENTATION:
UNREADABLE ORIENTATION
DOCUMENT COLOR:
MONOCHROME

DOCUMENT ORIENTATION:
READABLE ORIENTATION
DOCUMENT COLOR:
MONOCHROME

DOCUMENT ORIENTATION:
UNREADABLE ORIENTATION
DOCUMENT COLOR:
FULL-COLOR

DOCUMENT ORIENTATION:
READABLE ORIENTATION
DOCUMENT COLOR:
FULL-COLOR

| | |
|---|---|
| DOCUMENT SIZE | A4 ▷ |
| DOCUMENT ORIENTATION | UNREADABLE ORIENTATION ▷ |
| DOCUMENT COLOR | MONOCHROME ▷ |
| DUPLEX | DUPLEX (OPEN TO TOP) ▷ |
| RESOLUTION | 300dpi ▷ |
| FILE TYPE | PDF ▷ |

START SCAN

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2023-043951, filed on Mar. 20, 2023, in the Japan Patent Office, the entire disclosure of which is hereby incorporated by reference herein.

BACKGROUND

Technical Field

Embodiments of this disclosure relate to an information processing apparatus, an information processing system, an information processing method, and a non-transitory recording medium.

Related Art

There is a system including an information terminal such as a smartphone and an image reading apparatus such as a scanner. In the system, the settings of a scanning operation are configured by the information terminal and transmitted to the image reading apparatus via a network. Then, in accordance with a scan execution instruction from the information terminal, the image reading apparatus executes the scanning operation, and a result of the scanning operation is received by the information terminal.

In this system with the information terminal and the image reading apparatus, the information terminal receives a preview image for a user to check the image of a document read by the image reading apparatus. If an error is found in the settings of the scanning operation in this case, the user resets the document on the image reading apparatus and performs a preview display operation again. To save the user from this extra work, there is a technique of creating a preview image to display a preview to the user based on the information of the settings of the scanning operation received from an image forming apparatus (an example of the image reading apparatus) and the image of the document captured by an image capturing device.

SUMMARY

In one embodiment of this invention, there is provided an information processing apparatus that includes, for example, an image sensor and circuitry. The image sensor captures an image of an automatic document feeder of an image reading apparatus with a document set on the automatic document feeder. The circuitry acquires information related to the automatic document feeder from an information medium placed on the image reading apparatus. Based on the captured image of the automatic document feeder and the acquired information, the circuitry estimates setting information of a reading operation performed by the image reading apparatus, and instructs the image reading apparatus to perform the reading operation on the document based on the estimated setting information.

In one embodiment of this invention, there is provided an information processing system that includes, for example, an image sensor, a first information processing apparatus, and a second information processing apparatus. The image sensor captures an image of an automatic document feeder of an image reading apparatus with a document set on the automatic document feeder. The first information processing apparatus includes first circuitry. The second information processing apparatus includes second circuitry. The first circuitry acquires information related to the automatic document feeder from an information medium placed on the image reading apparatus, and transmits the captured image of the automatic document feeder and the acquired information to the second information processing apparatus. The second circuitry receives the transmitted captured image and acquired information, estimates setting information of a reading operation performed by the image reading apparatus based on the received captured image and acquired information, and instructs the image reading apparatus to perform the reading operation on the document based on the estimated setting information.

In one embodiment of this invention, there is provided an information processing method that includes, for example, capturing an image of an automatic document feeder of an image reading apparatus with a document set on the automatic document feeder, acquiring information related to the automatic document feeder from an information medium placed on the image reading apparatus, estimating setting information of a reading operation performed by the image reading apparatus based on the captured image of the automatic document feeder and the acquired information, and instructing the image reading apparatus to perform the reading operation on the document based on the estimated setting information.

In one embodiment of this invention, there is provided a non-transitory recording medium storing a plurality of instructions which, when executed by one or more processors, causes the one or more processors to perform the above-described information processing method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a diagram illustrating an example of a screen displaying setting information estimated by the information terminal of the first embodiment;

Figure 1:
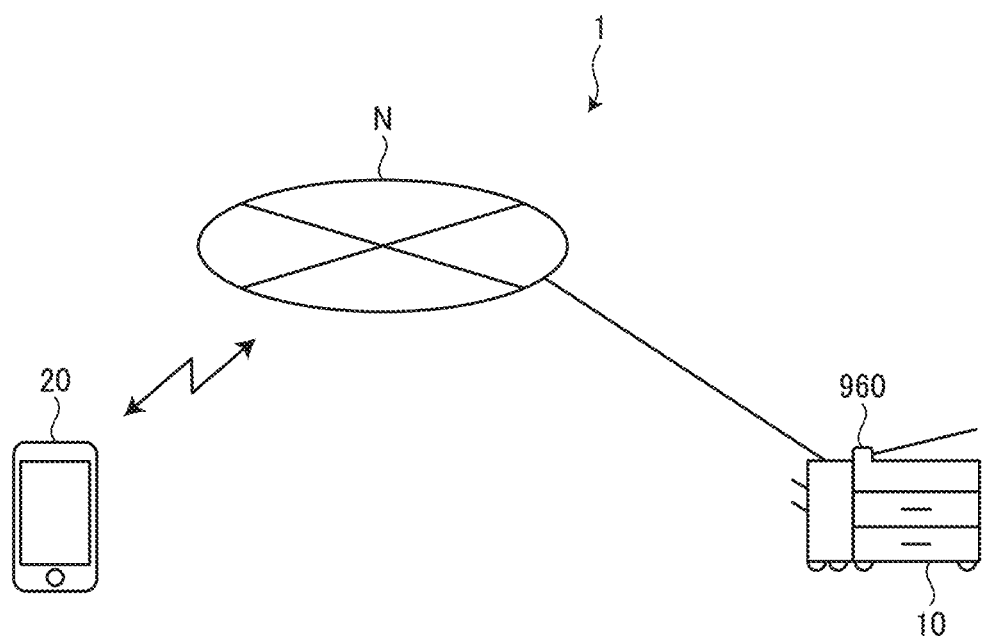
FIG. 1 is a diagram illustrating an exemplary general arrangement of an information processing system according to a first embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, an information processing apparatus, an information processing system, an information processing method, and a non-transitory recording medium according to embodiments of the present disclosure are described in detail below. As used herein, the singular forms "a," "an," and "the" are intended to include the plural forms as well, unless the context clearly indicates otherwise.

Herein, the term "computer software" (hereinafter referred to as software) refers to a program related to the operation of a computer or other information used for the processing of a computer and equivalent to a program. The term "application software" collectively refers to software used to perform a specific task. The term "operating system (OS)" refers to software that controls a computer to allow application software, for example, to use computer resources. The OS performs basic control and management of the computer, such as the control of inputs and outputs, the management of hardware such as a memory and a hard disk, and the management of processes.

The application software operates with functions provided by the OS. The term program" refers to commands to a computer combined to obtain a result. The information equivalent to a program is not direct commands to the computer and thus is not called a program, but is similar to a program in specifying a process of the computer. For example, a data structure (i.e., a logical structure of data expressed as correlation between data elements) corresponds to the information equivalent to a program.

A first embodiment of the present invention will be described.

FIG. 1 is a diagram illustrating an exemplary general arrangement of an information processing system 1 of the first embodiment. A general arrangement of the information processing system 1 of the first embodiment will be described with FIG. 1.

The information processing system 1 illustrated in FIG. 1 is an information processing system for causing a multi-function peripheral (MFP) 10 to perform a scanning operation (i.e., a reading operation) with setting information estimated by an information terminal 20. As illustrated in FIG. 1, the information processing system 1 includes the MFP 10 and the information terminal 20, which communicate data to each other via a network N. The network N may include a wired network and a wireless network.

Herein, the MFP 10 is an image forming apparatus with at least two functions out of a copier function, a printer function, a scanner function, and a facsimile (FAX) function. In the present example, the MFP 10 is assumed to have at least the scanner function.

The MFP 10 is an image forming apparatus (an example of an image reading apparatus) that performs the reading operation on a document set on an automatic document feeder (ADF) 960 based on the setting information of the scanning operation estimated by the information terminal 20. It is assumed in the following description of the first embodiment that the MFP 10 has at least the scanner function (i.e., a reading function) and the copier function (i.e., a printing function), i.e., that the MFP 10 has at least a scanner and a printer.

The information terminal 20 is an information processing apparatus, such as a smartphone or a tablet terminal, that captures the image of the document set on the ADF 960, estimates the setting information of the scanning operation based on the captured image, and instructs the MFP 10 to perform the scanning operation (i.e., the reading operation) on the document with the setting information.

The MFP 10 and the information terminal 20 may communicate data to each other not via the network N but through short-range wireless communication conforming to a standard such as Bluetooth™, for example.

Figure 2:
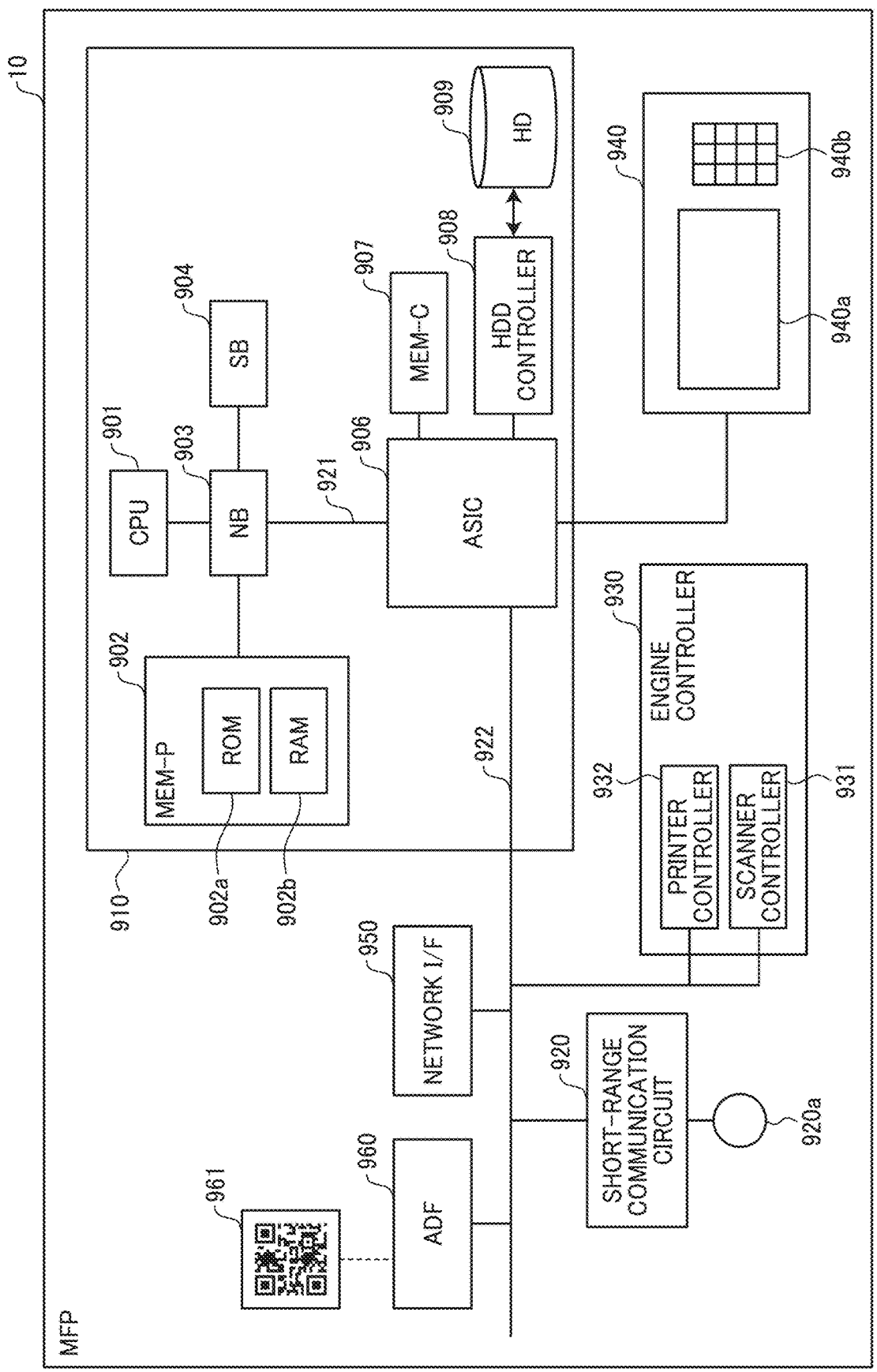
FIG. 2 is a diagram illustrating an exemplary hardware configuration of a multifunction peripheral (MFP) included in the information processing system of the first embodiment.

FIG. 2 is a diagram illustrating an exemplary hardware configuration of the MFP 10 of the first embodiment. A hardware configuration of the MFP 10 of the first embodiment will be described with FIG. 2.

As illustrated in FIG. 2, the MFP 10 includes a controller 910, a short-range communication circuit 920, an engine controller 930, an operation panel 940, a network interface (I/F) 950, and the ADF 960.

The controller 910 includes a central processing unit (CPU) 901 as a major component of a computer forming the MFP 10, a system memory (MEM-P) 902, a north bridge (NB) 903, a south bridge (SB) 904, an application specific integrated circuit (ASIC) 906, a local memory (MEM-C) 907, a hard disk drive (HDD) controller 908, and a hard disk (HD) 909. The NB 903 and the ASIC 906 are connected to each other by an accelerated graphics port (AGP) bus 921.

The CPU 901 is an arithmetic device that performs overall control of the MFP 10. The NB 903 is a bridge for connecting the CPU 901, the MEM-P 902, the SB 904, and the AGP bus 921 to each other. The NB 903 includes a memory controller for controlling the writing and reading to and from the MEM-P 902, a peripheral component interconnect (PCI) master, and an AGP target.

The MEM-P 902 includes a read only memory (ROM) 902a and a random access memory (RAM) 902b. The ROM 902a is a memory for storing programs and data for implementing functions of the controller 910. The RAM 902b is used as a memory in deploying a program or data or as a rendering memory in memory printing, for example. Each of the programs stored in the ROM 902a and deployed in the RAM 902b may be provided as recorded on a computer readable recording medium, such as a compact disc-ROM (CD-ROM), a CR-recordable (CD-R), or a digital versatile disc (DVD), in an installable or executable file format.

The SB 904 is a bridge for connecting the NB 903 to a PCI device and a peripheral device, for example. The ASIC 906, which is an integrated circuit (IC) for image processing, includes hardware components for image processing. The ASIC 906 functions as a bridge for connecting the AGP bus 921, a PCI bus 922, the HDD controller 908, and the MEM-C 907 to each other. The ASIC 906 includes a PCI target, an AGP master, an arbiter (ARB) as a core component of the ASIC 906, a memory controller that controls the MEM-C 907, a plurality of direct memory access controllers (DMACs) that perform processes such as the rotation of image data with a hardware logic, and a PCI unit that transfers data to and from a scanner controller 931 or a printer controller 932 of the engine controller 930 via the PCI bus 922. The ASIC 906 may be connected to an interface such as a universal serial bus (USB) interface or an institute of electrical and electronics engineers (IEEE) 1394 interface.

The MEM-C 907 is a local memory used as a copy image buffer and a code buffer. The HD 909 is a storage device for storing image data, font data for use in printing, and forms. The HDD controller 908 is a controller that controls data writing and reading to and from the HD 909 under the control of the CPU 901. The HDD controller 908 and the HD 909 may be replaced by a solid state drive (SSD).

The AGP bus 921 is a bus interface for a graphics accelerator card proposed to speed up graphics processing. The AGP bus 921 enables the graphics accelerator card to directly access the MEM-P 902 with a high throughput, thereby implementing a high-speed graphics accelerator card.

The short-range communication circuit 920 is a communication circuit conforming to a standard such as near field communication (NFC) or Bluetooth. The short-range communication circuit 920 is electrically connected to the ASIC 906 via the PCI bus 922. The short-range communication circuit 920 is connected to an antenna 920a for wireless communication.

The engine controller 930 includes the scanner controller 931 and the printer controller 932, each of which has an image processing function to perform processing such as error diffusion or gamma conversion.

The operation panel 940 includes a panel display 940a such as a touch panel and hardware keys 940b. The panel display 940a displays the current setting values or a selection screen, for example, and receives an input from a user. The hardware keys 940b include keys such as numeric keys for receiving the setting values of conditions related to image formation such as a density setting condition and a start key for receiving a copy start instruction.

With an application switch key included in the operation panel 940, the function of the MFP 10 is sequentially switched to a document box function, the copier function, the printer function, the scanner function, and the FAX function to select a desired function. When the document box function is selected, the MFP 10 is switched to document box mode. When the copier function is selected, the MFP 10 is switched to copy mode. When the printer function is selected, the MFP 10 is switched to printer mode. When the scanner function is selected, the MFP 10 is switched to scanner mode. When the FAX function is selected, the MFP 10 is switched to FAX mode.

The network I/F 950 is an interface for performing data communication via the network N. The network I/F 950 is an interface enabling communication conforming to Ethernet® and transmission control protocol/internet protocol (TCP/IP), for example. The network I/F 950 is electrically connected to the ASIC 906 via the PCI bus 922.

The ADF 960 is an apparatus that automatically feeds a document set thereon to use the scanner function or the copier function, to thereby read the document with the scanner controller 931. As illustrated in later-described FIG. 5, a quick response (QR) codex 961 is placed on the ADF 960 at a position allowing the reading of the QR code 961 by the information terminal 20. The QR code 961 is a two-dimensional code (an example of an information medium) in which information such as the IP address and the apparatus name of the MFP 10 and the actual size and the document reading direction (i.e., the vertical or horizontal direction) of the ADF 960 is encoded. The QR code 961 may be replaced by a two-dimensional code other than the QR code, such as a portable document format (PDF) 417 code or a DataMatrixx code (an example of the information medium), for example. The QR code 961 may be placed not on the ADP 960 but on a different part of the MFP 10.

The hardware configuration of the MFP 10 illustrated in FIG. 2 is illustrative. The MFP 10 is not necessarily required to include all of the components illustrated in FIG. 2. Further, the MFP 10 may include a component other than those illustrated in FIG. 2.

Figure 3:
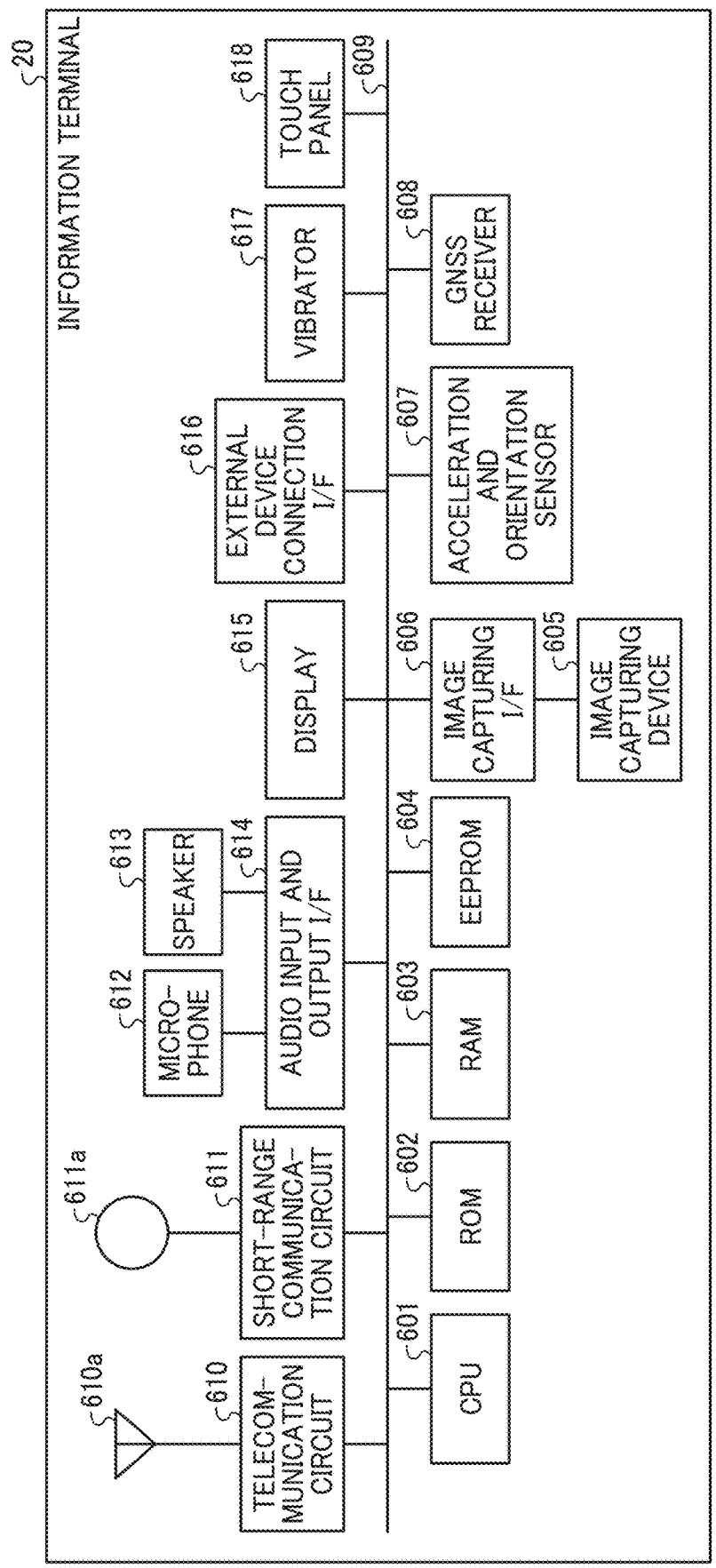
FIG. 3 is a diagram illustrating an exemplary hardware configuration of an information terminal included in the information processing system of the first embodiment.

FIG. 3 is a diagram illustrating an exemplary hardware configuration of the information terminal 20 of the first embodiment. A hardware configuration of the information terminal 20 of the first embodiment will be described with FIG. 3.

As illustrated in FIG. 3, the information terminal 20 includes a CPU 601, a ROM 602, a RAM 603, an electronically erasable programmable ROM (EEPROM) 604, an image capturing device 605, an image capturing I/F 606, an acceleration and orientation sensor 607, and a global navigation satellite system (GNSS) receiver 608.

The CPU 601 is an arithmetic device that controls overall operation of the information terminal 20. The ROM 602 is a nonvolatile storage device that stores a program used to drive the CPU 601, such as an initial program loader (IPL). The RAM 603 is a volatile storage device used as a work area of the CPU 601. The EEPROM 604 is a nonvolatile storage device that stores programs and various data.

The image capturing device 605 is a built-in image capturing device (e.g., a camera) that captures the image of a subject with an image sensor such as a complementary metal oxide semiconductor (CMOS) image sensor under the control of the CPU 601 to obtain image data. The CMOS image sensor may be replaced by another type of image sensor such as a charge coupled device (CCD) image sensor. The image capturing I/F 606 is an interface for controlling the driving of the image capturing device 605.

The acceleration and orientation sensor 607 includes various sensors such as an electromagnetic compass that detects geomagnetism, a gyrocompass, and an acceleration sensor.

The GNSS receiver 608 is a receiver device that receives positioning signals from positioning satellites. For example, the GNSS receiver 608 receives global positioning system (GPS) signals from GPS satellites.

As illustrated in FIG. 3, the information terminal 20 further includes a telecommunication circuit 610, an antenna 610a, a short-range communication circuit 611, an antenna 611a, a microphone 612, a speaker 613, an audio input and output I/F 614, a display 615 (i.e., a display device), an external device connection I/F 616, a vibrator 617, and a touch panel 618.

The telecommunication circuit 610 is a communication circuit that performs wireless communication with another device or apparatus via the antenna 610a and the network N in accordance with a standard such as wireless fidelity (Wi-Fi®).

The short-range communication circuit 611 is a communication circuit that performs short-range wireless communication with another device or apparatus via the antenna 611a in accordance with a standard such as NFC or Bluetooth.

The microphone 612 is a built-in sound collecting device that converts sound into electrical signal. The speaker 613 is a built-in audio device that converts electrical signal into physical vibration to output the sound of music or voice, for example.

The audio input and output I/F 614 is an interface that processes the input of audio signal from the microphone 612 and the output of audio signal to the speaker 613 under the control of the CPU 601. The microphone 612 and the speaker 613 may be replaced by a wirelessly connected headset.

The display 615 is a display device, such as a liquid crystal or organic electroluminescence (EL) display, that displays the image of the subject and various icons, for example. The external device connection I/F 616 is an interface conforming to a standard such as USB to connect various external devices to the information terminal 20.

The vibrator 617 is a device that causes physical vibration under the control of the CPU 601.

The touch panel 618 is an input device that receives the input of a touch operation performed on the display 615 by a user to implement various functions of the information terminal 20.

The CPU 601, the ROM 602, the RAM 603, the EEPROM 604, the image capturing I/F 606, the acceleration and orientation sensor 607, the GNSS receiver 608, the telecommunication circuit 610, the short-range communication circuit 611, the audio input and output I/F 614, the display 615, the external device connection I/F 616, the vibrator 617, and the touch panel 618 are communicably connected to each other by a bus line 609 including address buses and data buses.

The hardware configuration of the information terminal 20 illustrated in FIG. 3 is illustrative. The information terminal 20 is not necessary required to include all of the components illustrated in FIG. 3. Further, the information terminal 20 may include a component other than those illustrated in FIG. 3.

Figure 4:
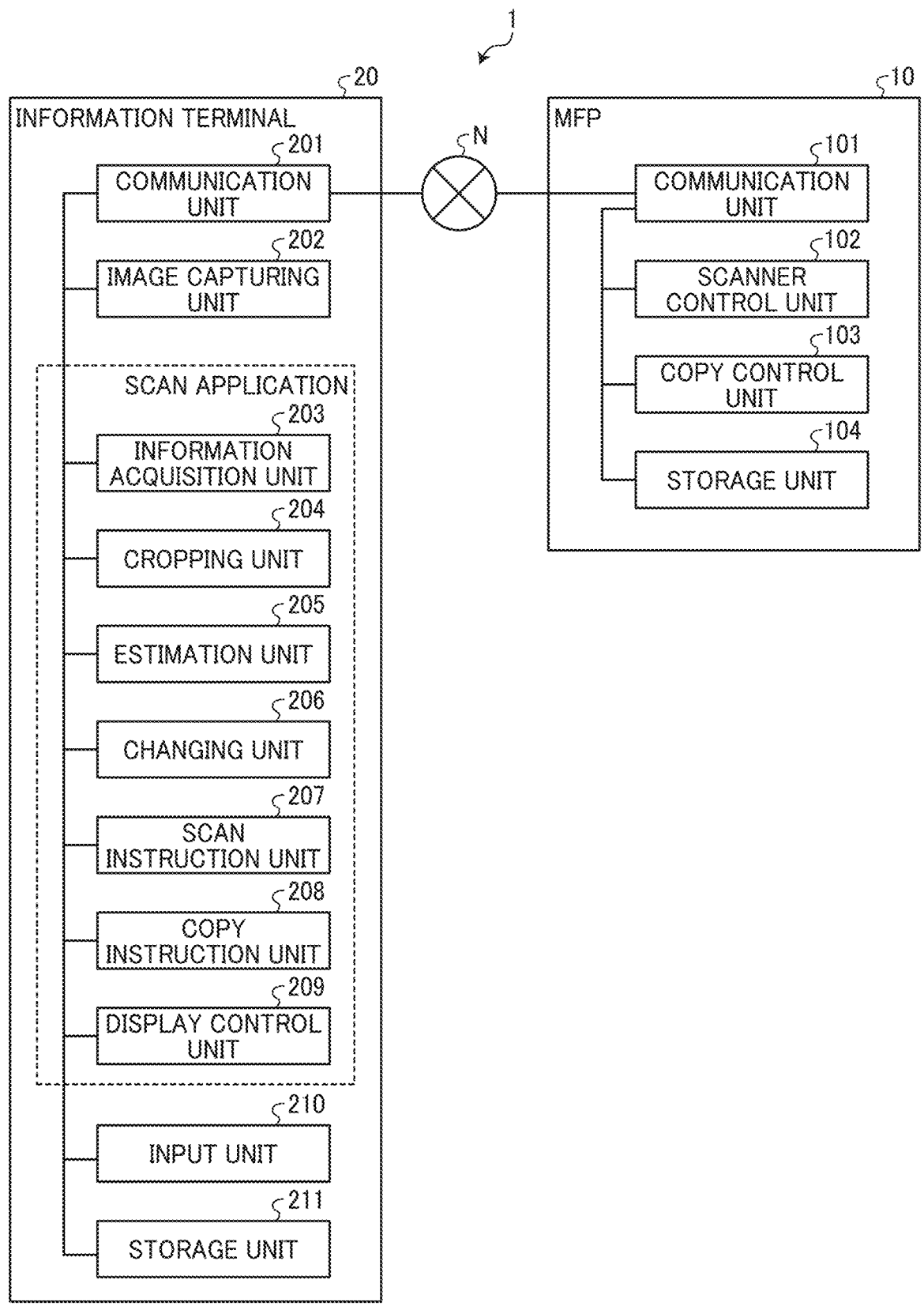
FIG. 4 is a diagram illustrating an exemplary configuration of functional blocks of the information processing system of the first embodiment.
Figure 5:
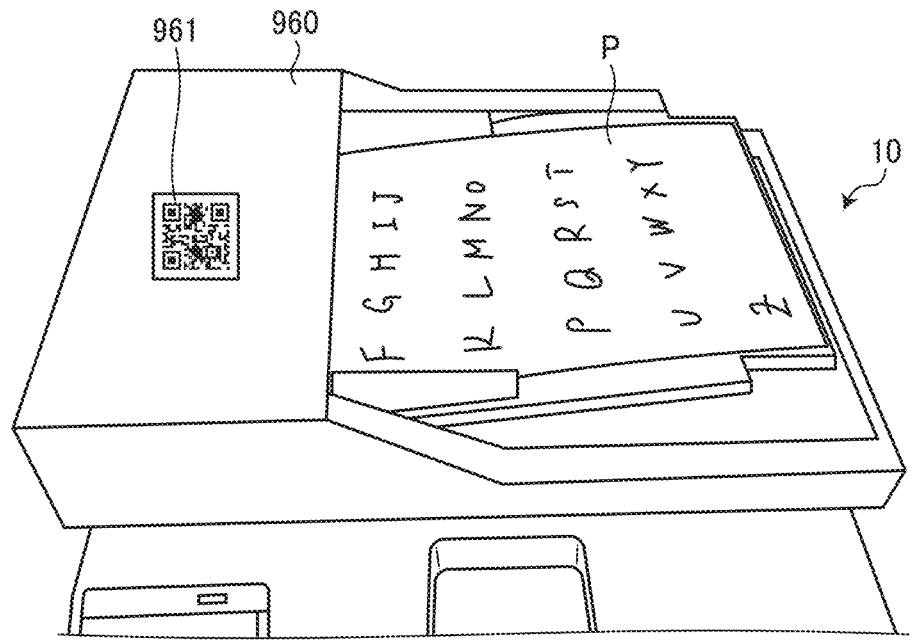
FIG. 5 is a diagram illustrating an automatic document feeder (ADF) of the MFP of the first embodiment with a document set on the ADF.
Figure 6:
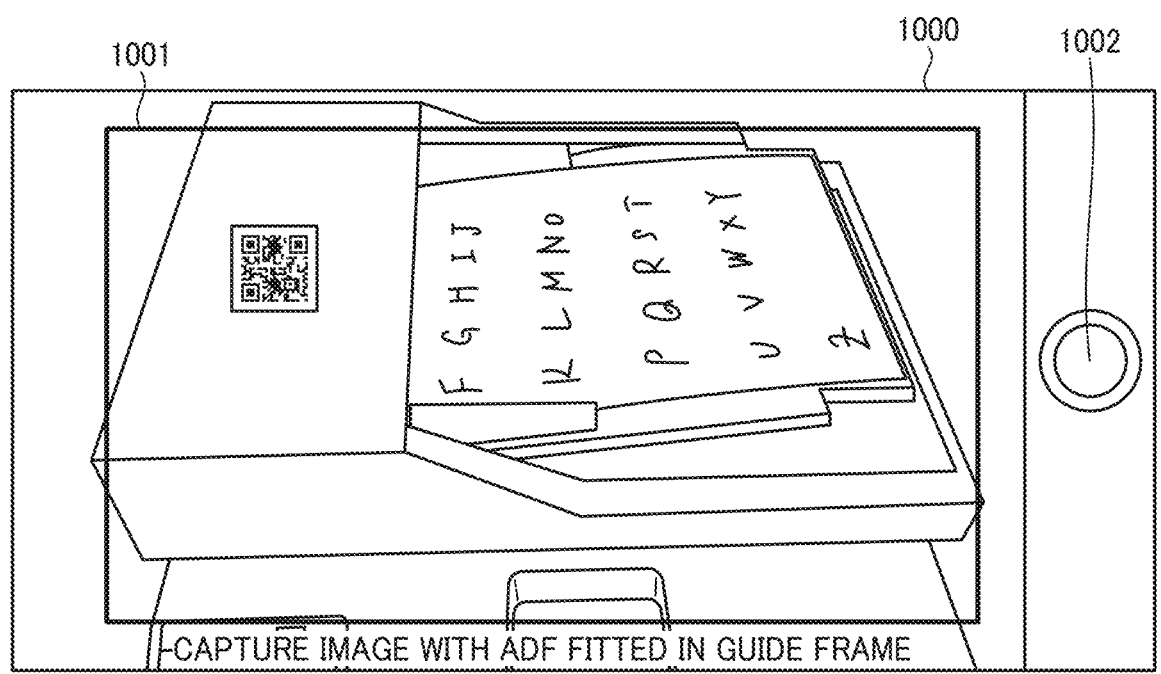
FIG. 6 is a diagram illustrating an example of a shooting guide screen displayed on the information terminal of the first embodiment to capture an image with an image capturing unit of the information terminal.
Figures 7, 8:
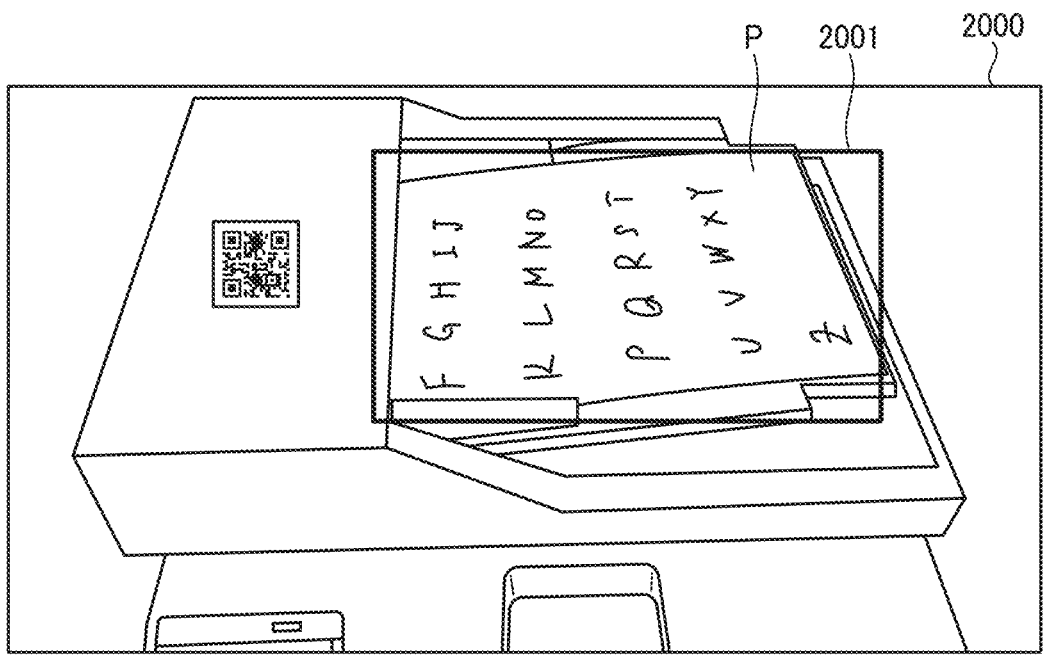
FIG. 7 is a diagram illustrating an example of information read from a quick response (QR) codex of the first embodiment.
FIG. 8 is a diagram illustrating an operation of cropping a document portion from the image captured by the information terminal of the first embodiment.
Figure 9:
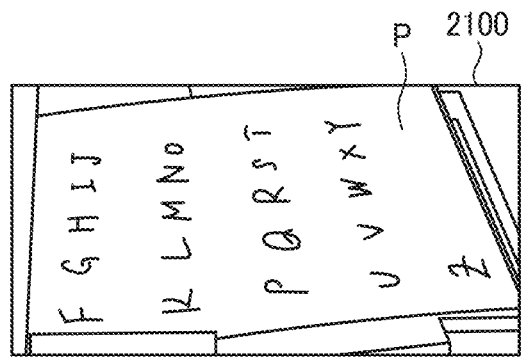
FIG. 9 is a diagram illustrating an example of a document image cropped from the image captured by the information terminal of the first embodiment.
Figure 10:
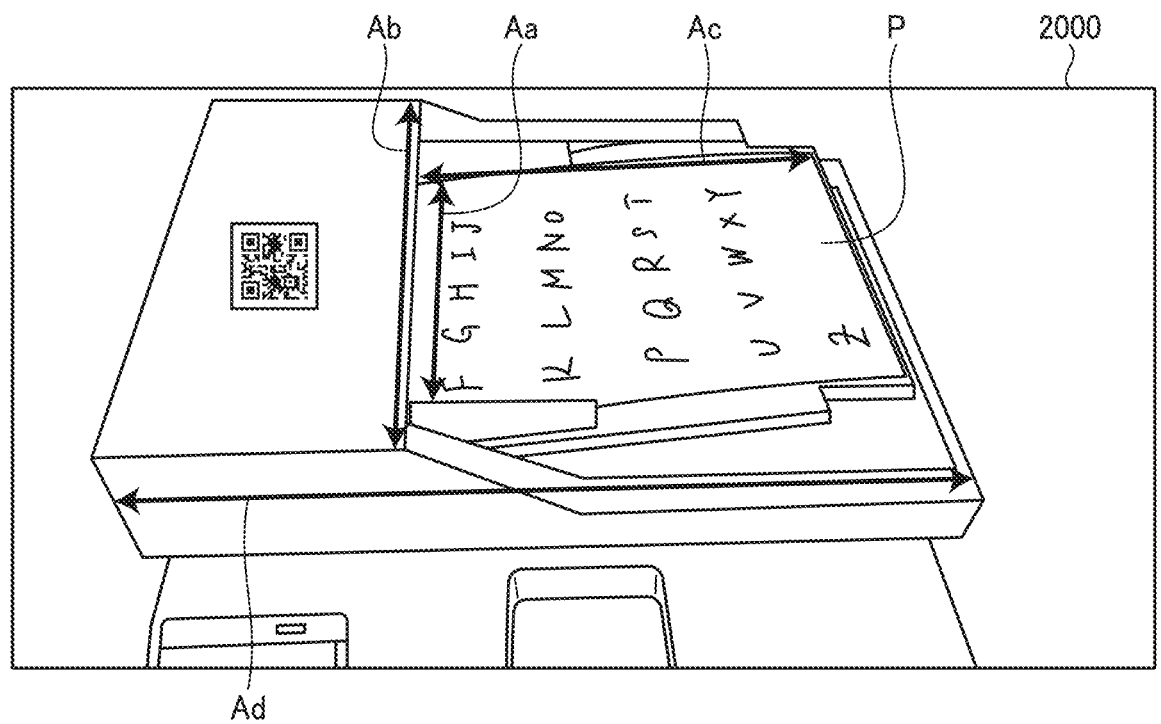
FIG. 10 is a diagram illustrating an operation of calculating the size of the document with the information terminal of the first embodiment.

FIG. 4 is a diagram illustrating an exemplary configuration of functional blocks of the information processing system 1 according to the first embodiment. FIG. 5 is a diagram illustrating the ADF 960 of the MFP 10 of the first embodiment with a document set on the ADF 960. FIG. 6 is a diagram illustrating an example of a shooting guide screen displayed on the information terminal 20 of the first embodiment to capture an image with an image capturing unit. FIG. 7 is a diagram illustrating an example of information read from the QR code 961. FIG. 8 is a diagram illustrating an operation of cropping a document portion from a captured image captured by the information terminal 20 of the first embodiment. FIG. 9 is a diagram illustrating an example of a document image cropped from the captured image captured by the information terminal 20 of the first embodiment. FIG. 10 is a diagram illustrating an operation of calculating the size of the document with the information terminal 20 of the first embodiment. FIG. 11 is a diagram illustrating an example of a screen displaying the setting information estimated by the information terminal 20 of the first embodiment.

Configurations and operations of functional blocks of the information processing system 1 according to the first embodiment will be described with FIGS. 4 to 11.

As illustrated in FIG. 4, the MFP 10 of the information processing system 1 includes a communication unit 101, a scanner control unit 102, a copy control unit 103, and a storage unit 104.

The communication unit 101 is a functional unit that performs data communication with the information terminal 20. The communication unit 101 is implemented by the network I/F 950 illustrated in FIG. 2.

The scanner control unit 102 is a functional unit that controls the scanning operation of the scanner controller 931. With the setting information of the scanning operation estimated by the information terminal 20, the scanner control unit 102 causes the scanner controller 931 to perform the scanning operation on the document fed by the ADF 960. The scanner control unit 102 is implemented by a program executed by the CPU 901 illustrated in FIG. 2, for example.

The copy control unit 103 is a functional unit that controls a copying operation of the scanner controller 931 and the printer controller 932. With the setting information of the scanning operation estimated by the information terminal 20, the copy control unit 103 causes the scanner controller 931 to perform the scanning operation on the document fed by the ADF 960, and causes the printer controller 932 to perform a printing operation based on a scanned image. The copy control unit 103 is implemented by a program executed by the CPU 901 illustrated in FIG. 2, for example.

The storage unit 104 is a functional unit that stores, for example, the information of the QR code 961 read by and received from the information terminal 20. The storage unit 104 is implemented by the HD 909 illustrated in FIG. 2.

Each of the functional units of the MFP 10 illustrated in FIG. 4 is a conceptual representation of a function, and is not limited to the configuration illustrated in FIG. 4. For example, a plurality of functional units illustrated in FIG. 4 as separate functional units of the MFP 10 may be configured as a single functional unit. Further, the function of any of the functional units of the MFP 10 illustrated in FIG. 4 may be divided into a plurality of functions to form a plurality of functional units.

The information terminal 20 of the information processing system 1 includes a communication unit 201, an image capturing unit 202, an information acquisition unit 203 (an acquisition unit), a cropping unit 204, an estimation unit 205, a changing unit 206, a scan instruction unit 207 (a first instruction unit), a copy instruction unit 208 (a second instruction unit), a display control unit 209, an input unit 210, and a storage unit 211.

The communication unit 201 is a functional unit that preforms data communication with the MFP 10. The communication unit 201 is implemented by the telecommunication circuit 610 and the antenna 610a illustrated in FIG. 3.

The image capturing unit 202 is a functional unit that captures an image to obtain a captured image. In the first embodiment, the image capturing unit 202 captures the image of the ADF 960 of the MFP 10 with a document P set on the ADF 960, as illustrated in FIG. 5, to obtain a captured image 2000 illustrated in FIG. 8, for example. In this case, in accordance with an operation performed on the input unit 210 by the user, the display control unit 209 of the information terminal 20 causes the display 615 to display a shooting guide screen 1000 illustrated in FIG. 6. The shooting guide screen 1000 is a screen that displays the image shot in real time by the image capturing unit 202. As illustrated in FIG. 6, the shooting guide screen 1000 includes a shooting frame 1001 and a shutter button 1002. The shooting frame 1001 is a display frame (an example of guide information) for leading and guiding the user to capture the ADF 960. Further, a guide message (an example of the guide information) for guiding the user to fit the ADF 960 in the shooting frame 1001 may be displayed, as illustrated in FIG. 6. The thus-displayed guide information facilitates the user to capture the image of the ADF 960. The shutter button 1002 is a button for releasing the shutter of the image capturing unit 202. When the user presses the shutter button 1002, the image capturing unit 202 captures the image of the ADF 960 fitted in the shooting frame 1001, to thereby obtain the captured image 2000 illustrated in FIG. 8, for example. The image capturing unit 202 is implemented by the image capturing device 605 illustrated in FIG. 3.

The information acquisition unit 203 is a functional unit that detects the QR code 961 placed on the ADF 960, as illustrated in FIG. 5, from the image captured by the image capturing unit 202, and decodes the detected QR code 961 to acquire information (hereinafter occasionally referred to as the QR code information). FIG. 7 illustrates an example in which the QR code information decoded by the information acquisition unit 203 is expressed in JavaScript® object notation (JSON) format. As illustrated in FIG. 7, for example, the QR code information includes information such as the IP address and the apparatus name of the MFP 10 and the size (e.g., the vertical width (depth) and the horizontal width) and the document reading direction of the ADF 960. In the example of FIG. 7, the IP address and the apparatus name of the MFP 10 are "10.60.100.100" and "ABC-PR," respectively. Further, the width, the depth, and the document reading direction of the ADF 960 are "450," "350," and "vertical," respectively.

If the captured image 2000 captured by the image capturing unit 202 includes the QR code 961 as illustrated in FIGS. 5 and 6, the information acquisition unit 203 may decode the QR code 961 included in the captured image 2000.

The cropping unit 204 is a functional unit that crops the image of the document P (i.e., a document image) from the captured image 2000 of the ADF 960 captured by the image capturing unit 202 with the document P set on the ADF 960. Specifically, as illustrated in FIG. 8, the cropping unit 204 detects a document portion 2001, which corresponds to the image of the document P, from the captured image 2000 of the ADF 960 captured by the image capturing unit 202 with the document P set on the ADF 960. The cropping unit 204 then crops the document portion 2001 as a document image 2100 illustrated in FIG. 9.

The estimation unit 205 is a functional unit that estimates the setting information of the scanning operation of the MFP 10 based on the captured image 2000 of the ADF 960 captured by the image capturing unit 202 with the document P set on the ADF 960 and the information related to the ADF 960 included in the QR code information acquired by the information acquisition unit 203.

The estimation unit 205 first estimates the document size of the document P set on the ADF 960 as the setting information of the scanning operation. Specifically, as illustrated in FIG. 10, the estimation unit 205 first detects the widths indicated by arrows Aa, Ab, Ac, and Ad from the captured image 2000 captured by the image capturing unit 202. The arrow Aa indicates the vertical width (i.e., depth) of the document P in the captured image 2000. The arrow Ab indicates the vertical width (i.e., depth) of the ADF 960 in the captured image 2000. The arrow Ac indicates the horizontal width of a visible portion of the document P in the captured image 2000. The arrow Ad indicates the horizontal width of the ADF 960 in the captured image 2000. The actual size (i.e., vertical and horizontal widths) of the ADF 960 is already known from the QR code information. The estimation unit 205 therefore calculates the actual size (i.e., vertical and horizontal widths) of the document P from equations (1) and (2) given below.

$$\text{Actual vertical width of document } P = (\text{length of arrow Aa/length of arrow Ab}) \times \text{actual vertical width of ADF} \quad (1)$$

$$\text{Actual horizontal width of document } P = (\text{length of arrow Ac/length of arrow Ad}) \times \text{actual horizontal width of ADF} + \text{horizontal width of hidden portion of document P} \quad (2)$$

In equation (2), "horizontal width of hidden portion of document P" refers to the horizontal width of a portion of the document P located inside the ADF 960 and thus invisible when the document P is set on the ADF 960, as illustrated in FIG. 10. The horizontal width of the hidden portion of the document P is the same in value regardless of the size of the document P, and thus may be included in the QR code information of the QR code 961.

Then, out of a plurality of regular document sizes compatible with the scanner controller 931 of the MFP 10, the estimation unit 205 determines a regular document size closest to the vertical width and the horizontal width of the document P calculated from equations (1) and (2) as the estimated document size. Information settable in the scanner controller 931 of the MFP 10, which includes the information of the regular document sizes compatible with the scanner controller 931, may be previously acquired by the information terminal 20 with eSCL protocol, for example.

Then, the estimation unit 205 estimates the document orientation of the document P set on the ADF 960 as the setting information of the scanning operation. Specifically, the estimation unit 205 performs an optical character recognition (OCR) process on the document image 2100 cropped by the cropping unit 204, and estimates the document orientation of the document P based on the number of recognized characters. The document orientation estimation process of the estimation unit 205 will be described in detail later with FIG. 13.

The estimation unit 205 then estimates the document color of the document P set on the ADF 960 as the setting information of the scanning operation. Specifically, the estimation unit 205 estimates the document color of the document P based on the color of the document image 2100 cropped by the cropping unit 204.

Then, the display control unit 209 displays the setting information of the scanning operation of the MFP 10 estimated by the estimation unit 205 on a scan setting screen 1100 illustrated in FIG. 11, for example. The scan setting screen 1100 is displayed on the display 615. As illustrated in FIG. 11, the scan setting screen 1100 includes a selection frame 1101, a setting information display area 1102, and a "START SCAN" button 1103. Further, combinations of the document orientation estimated by the estimation unit 205, the opposite document orientation to the estimated document orientation, the document color estimated by the estimation unit 205, and a document color different from the estimated document color are displayed in an upper portion of the scan setting screen 1100 based on the order of priority laid out in TABLE 1 given below. That is, the setting information estimated by the estimation unit 205 and setting information different from the estimated setting information are displayed on the scan setting screen 1100 as setting candidates.

TABLE 1

| Order of priority | Document orientation | Document color |
|---|---|---|
| 1 | Estimated document orientation | Estimated document color |
| 2 | Document orientation opposite to estimated document orientation (i.e., readable orientation if the estimated document orientation is unreadable orientation, or unreadable orientation if the estimated document orientation is readable orientation) | Estimated document color |
| 3 | Estimated document orientation | Document color different from estimated document color (i.e., full-color if the estimated document color is monochrome, or monochrome if the estimated document color is full-color) |
| 4 | Document orientation opposite to estimated document orientation | Document color different from estimated document color |

For example, as the combination of the highest priority in TABLE 1, the combination of the document orientation and the document color estimated by the estimation unit 205 is displayed on top together with a preview image of the document image in this case. This combination is selected with the selection frame 1101 in a default state when the scan setting screen 1100 is initially displayed. As the combination of the second highest priority in TABLE 1, the combination of the document orientation opposite to the document orientation estimated by the estimation unit 205 and the estimated document color is displayed together with a preview image of the document image in this case. Herein, the document orientation opposite to the estimated document orientation is a readable orientation if the document orientation estimated by the estimation unit 205 is an unreadable orientation. If the document orientation estimated by the estimation unit 205 is the readable orientation, the document orientation opposite to the estimated document orientation is the unreadable orientation. As the combination of the third highest priority in TABLE 1, the combination of the document orientation estimated by the estimation unit 205 and a document color different from the estimated document color is displayed together with a preview image of the document image in this case. Herein, the document color different from the estimated document color is full-color if the document color estimated by the estimation unit 205 is monochrome. If the document color estimated by the estimation unit 205 is full-color, the document color different from the estimated document color is monochrome. As the combination of the fourth highest priority in TABLE 1, the combination of the document orientation opposite to document orientation estimated by the estimation unit 205 and the document color different from the estimated document color is displayed together with a preview image of the document image in this case. That is, although the document orientation and the document color estimated by the estimation unit 205 are displayed on top, a plurality of combinations of the document orientation and the document color are presented in accordance with the order of priority to allow the user to change the selection as desired, thereby improving the user convenience.

The setting information display area 1102 is an area displaying the setting information of the scanning operation including the setting information estimated by the estimation unit 205. In the example of FIG. 11, the setting information display area 1102 displays document size, document orientation, document color, duplex or simplex, resolution, and file type as the setting information of the scanning operation. In the default state when the scan setting screen 1100 is initially displayed, the document size, the document orientation, and the document color estimated by the estimation unit 205 are displayed as the setting information. As for the items of duplex or simplex, resolution, and file type, respective default values thereof may be displayed as the setting information, for example.

The "START SCAN" button 1103 is a button for causing the MFP 10 to start the scanning operation based on the setting information of the scanning operation displayed in the setting information display area 1102.

The setting information of the scanning operation estimated by the estimation unit 205 is not limited to the document size, the document orientation, and the document color; other settings of the scanning operation may be estimated by the estimation unit 205.

The changing unit 206 is a functional unit that changes the setting information of the scanning operation, which includes the setting information estimated by the estimation unit 205 (e.g., the document size, the document orientation, and the document color), in accordance with the operation performed on the input unit 210 by the user. For example, when the user selects a different combination of the document orientation and the document color by tapping the combination in the scan setting screen 1100, the display control unit 209 moves the selection frame 1101 to the selected combination, and the changing unit 206 changes the setting information to the combination selected with the selection frame 1101. In this case, the display control unit 209 changes the display of the setting information in the setting information display area 1102 to the document orientation and the document color corresponding to the combination selected by the user. If the setting information in the setting information display area 1102 of the scan setting screen 1100 is changed by the tapping operation, for example, the changing unit 206 changes the setting information accordingly. If the setting information changed by the tapping operation includes at least the document orientation or the document color, the display control unit 209 changes the display of the selection frame 1101 by moving the selection frame 1101 to the changed combination of the document orientation and the document color.

The scan instruction unit 207 is a functional unit that instructs the MFP 10 to perform the scanning operation on the document P based on the setting information of the scanning operation including the setting information estimated by the estimation unit 205 or on the setting information changed by the changing unit 206. Specifically, if the "START SCAN" button 1103 of the scan setting screen 1100 is pressed (i.e., tapped), the scan instruction unit 207 transmits an instruction and the setting information to the MFP 10 via the communication unit 201. Herein, the instruction is an instruction to the MFP 10 to perform the scanning operation on the document P, and the setting information is the setting information of the scanning operation including the setting information estimated by the estimation unit 205 or is the setting information changed by the changing unit 206. In this case, with the IP address of the MFP 10 included in the QR code information acquired by the information acquisition unit 203, the scan instruction unit 207 transmits the instruction to perform the scanning operation and the setting information to the MFP 10. Then, the scanner control unit 102 of the MFP 10 receives the instruction from the information terminal 20 to perform the scanning operation, and causes the scanner controller 931 to perform the scanning operation on the document P fed by the ADF 960 with the received setting information of the scanning operation.

The copy instruction unit 208 is a functional unit that instructs the MFP 10 to perform the copying operation on the document P based on the setting information of the scanning operation including the setting information estimated by the estimation unit 205 or on the setting information changed by the changing unit 206. The operation of the copy instruction unit 208 is similar to that of the scan instruction unit 207.

The display control unit 209 is a functional unit that controls the display operation of the display 615.

The input unit 210 is a functional unit that receives the input of an operation performed by the user. The input unit 210 is implemented by the touch panel 618 illustrated in FIG. 3.

The storage unit 211 is a functional unit that stores the captured image captured by the image capturing unit 202, the QR code information acquired by the information acquisition unit 203, the document image cropped by the cropping unit 204, the setting information estimated by the estimation unit 205, and the setting information changed by the changing unit 206, for example. The storage unit 211 is implemented by at least one of the RAM 603 or the EEPROM 604 illustrated in FIG. 3.

The information acquisition unit 203, the cropping unit 204, the estimation unit 205, the changing unit 206, the scan instruction unit 207, the copy instruction unit 208, and the display control unit 209 described above are implemented by a program (e.g., a scan application) executed by the CPU 601 illustrated in FIG. 3. Part or all of these functional units may be implemented by a hardware circuit (e.g., an integrated circuit) such as a field programmable gate array (FPGA) or an ASIC, instead of a program as software.

Each of the functional units of the information terminal 20 illustrated in FIG. 4 is a conceptual representation of a function, and is not limited to the configuration illustrated in FIG. 4. For example, a plurality of functional units illustrated in FIG. 4 as separate functional units of the information terminal 20 may be configured as a single functional unit. Further, the function of any of the functional units of the information terminal 20 illustrated in FIG. 4 may be divided into a plurality of functions to form a plurality of functional units.

Figure 12:
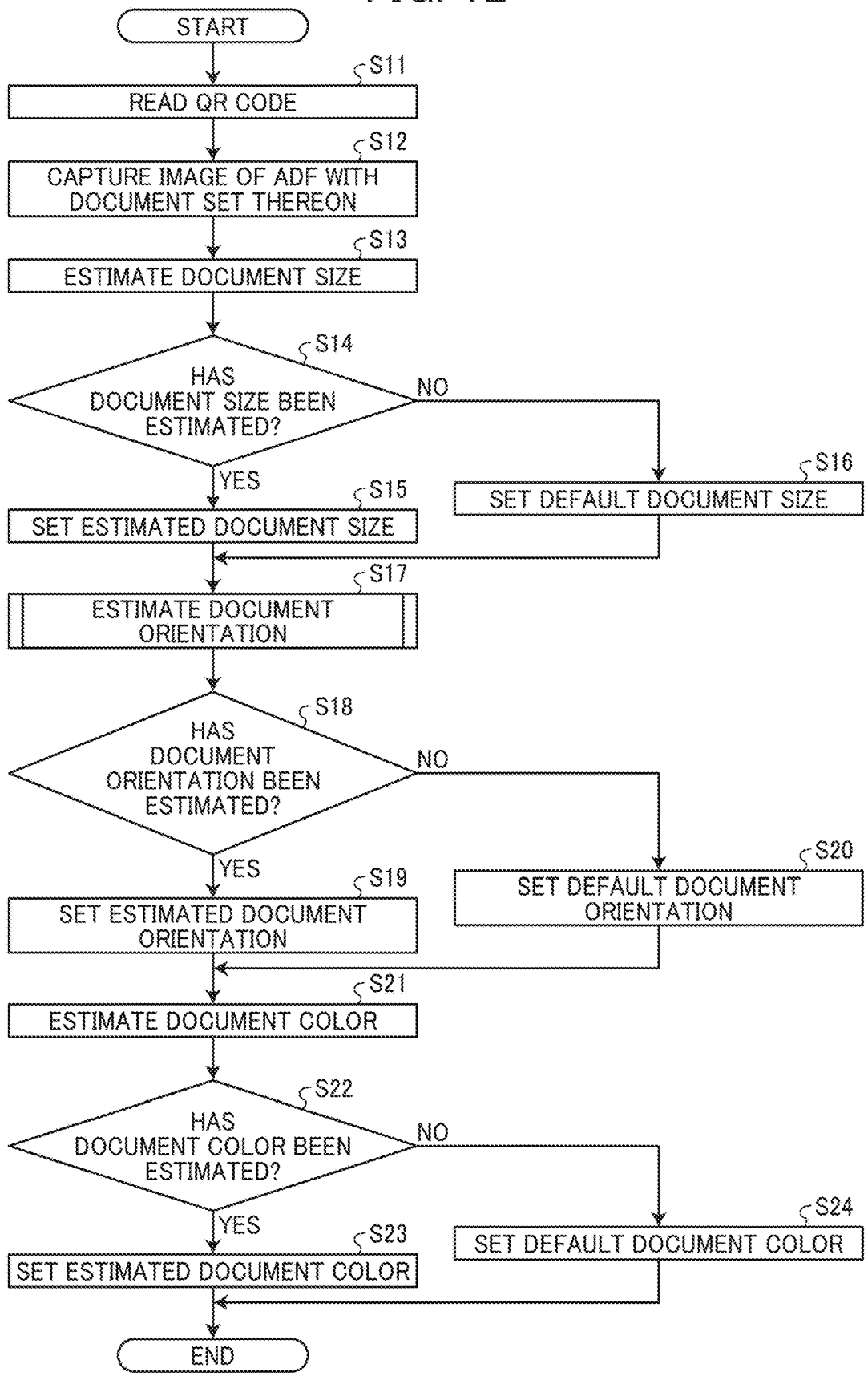
FIG. 12 is a flowchart illustrating an exemplary procedure of a scan setting estimation process performed by the information terminal of the first embodiment.
Figure 13:
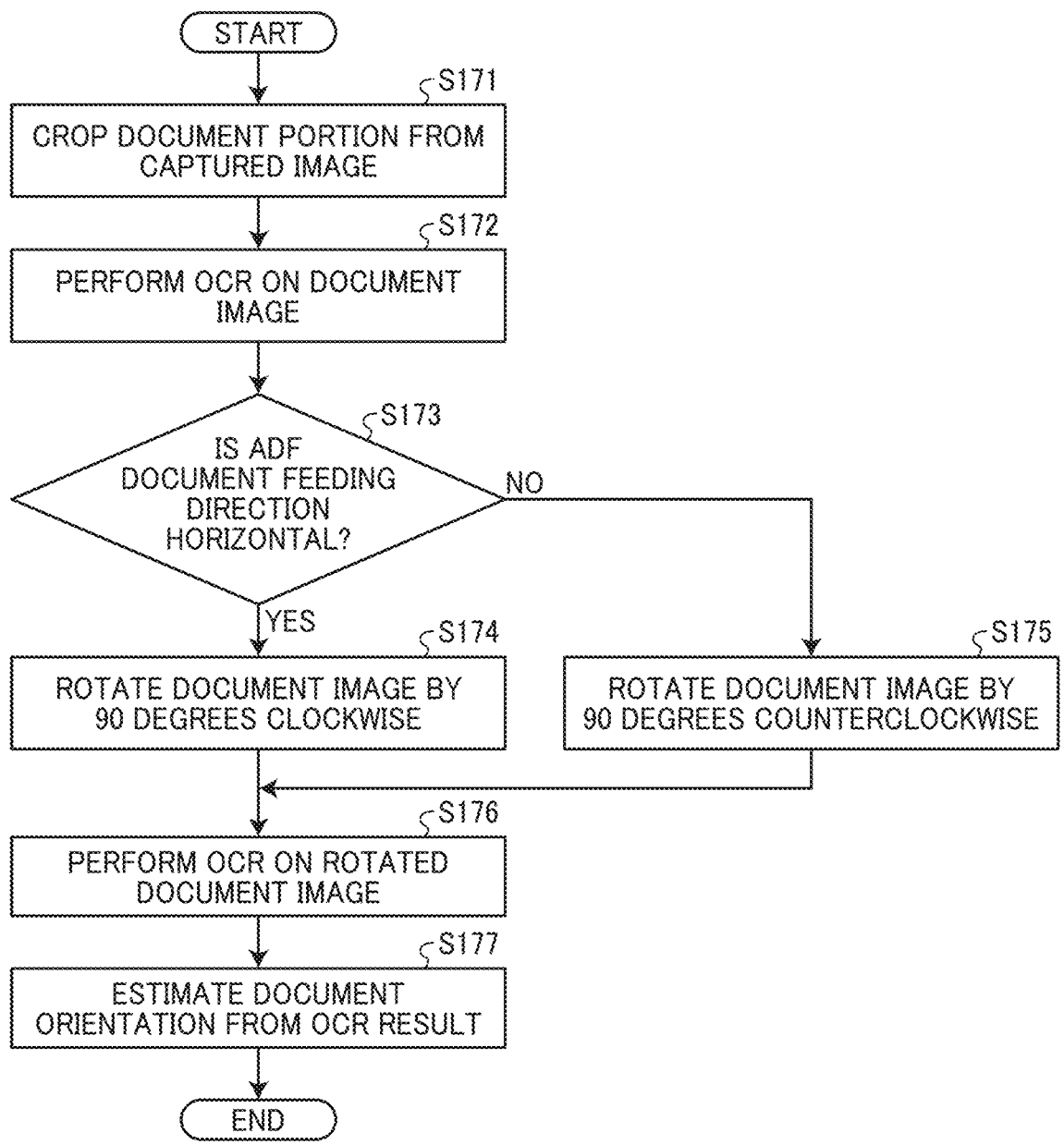
FIG. 13 is a flowchart illustrating an exemplary procedure of a document orientation estimation process performed by the information terminal of the first embodiment.

FIG. 12 is a flowchart illustrating an exemplary procedure of a scan setting estimation process by the information terminal 20 of the first embodiment. FIG. 13 is a flowchart illustrating an exemplary procedure of a document orientation estimation process by the information terminal 20 of the first embodiment. A procedure of the scan setting estimation process by the information terminal 20 of the first embodiment will be described with FIGS. 12 and 13.

At step S11, the user first directs the image capturing unit 202 of the information terminal 20 to the QR code 961 placed on the ADF 960 of the MFP 10. Then, the information acquisition unit 203 of the information terminal 20 detects the QR code 961 placed on the ADF 960, as illustrated in FIG. 5, from the image captured by the image capturing unit 202, and decodes (i.e., reads) the detected QR code 961 to acquire the QR code information. Then, the scan setting estimation process proceeds to step S12.

At step S12, the user sets a document on the ADF 960. Then, in accordance with an operation performed on the input unit 210 by the user, the display control unit 209 of the information terminal 20 causes the display 615 to display the shooting guide screen 1000 illustrated in FIG. 6. The user then presses (i.e., taps) the shutter button 1002 with the ADF 960 of the MFP 10 fitted in the shooting frame 1001 of the shooting guide screen 1000. Thereby, the image capturing unit 202 of the information terminal 20 captures the image of the ADF 960 with the document set thereon and obtains the captured image. Then, the scan setting estimation process proceeds to step S13.

At step S13, the estimation unit 205 of the information terminal 20 estimates the document size of the document set on the ADF 960 as the setting information of the scanning operation of the MFP 10 based on the captured image of the ADF 960 captured by the image capturing unit 202 with the document set on the ADF 960 and the information related to the ADF 960 included in the QR code information acquired by the information acquisition unit 203. The estimation of the document size is performed as described above. Then, the scan setting estimation process proceeds to step S14.

At step S14, if the estimation unit 205 successfully estimates the document size of the document set on the ADF 960 (YES at step S14), the scan setting estimation process proceeds to step S15. If the estimation unit 205 fails to estimate the document size of the document (NO at step S14), the scan setting estimation process proceeds to step S16.

At step S15, the estimation unit 205 sets the estimated document size as the setting information of the scanning operation. As described above, the document size estimated by the estimation unit 205 is changeable on the scan setting screen 1100 illustrated in FIG. 11. Then, the scan setting estimation process proceeds to step S17.

At step S16, having failed to estimate the document size, the estimation unit 205 sets a default document size as the setting information of the scanning operation. As described above, the document size set by the estimation unit 205 is changeable on the scan setting screen 1100 illustrated in FIG. 11. Then, the scan setting estimation process proceeds to step S17.

At step S17, the estimation unit 205 of the information terminal 20 estimates the document orientation of the document set on the ADF 960 as the setting information of the scanning operation of the MFP 10 based on the captured image of the ADF 960 captured by the image capturing unit 202 with the document set on the ADF 960.

The process of estimating the document orientation of the document (i.e., the document orientation estimation process) by the cropping unit 204 and the estimation unit 205 will be described in detail with FIG. 13.

At step S171, the cropping unit 204 of the information terminal 20 crops a document image of a document portion from the captured image captured by the image capturing unit 202. Then, the document orientation estimation process proceeds to step S172.

At step S172, the estimation unit 205 performs the OCR process on the document image cropped by the cropping unit 204 to recognize characters included in the document image. Then, the document orientation estimation process proceeds to step S173.

At step S173, the estimation unit 205 determines the document feeding direction of the ADF 960 based on the captured image of the ADF 960 captured by the image capturing unit 202. Alternatively, the estimation unit 205 may determine the document feeding direction of the ADF 960 based on the document reading direction included in the QR code information acquired by the information acquisition unit 203. If the document feeding direction of the ADF 960 is determined to be the horizontal direction (YES at step S173), the document orientation estimation process proceeds to step S174. If the document feeding direction of the ADF 960 is determined to be the vertical direction (NO at step S173), the document orientation estimation process proceeds to step S175.

At step S174, the estimation unit 205 rotates the document image by 90 degrees clockwise. Then, the document orientation estimation process proceeds to step S176.

At step S175, the estimation unit 205 rotates the document image by 90 degrees counterclockwise. Then, the document orientation estimation process proceeds to step S176.

At step S176, the estimation unit 205 performs the OCR process on the rotated document image to recognize characters included in the document image. Then, the document orientation estimation process proceeds to step S177.

At step S177, the estimation unit 205 estimates the document orientation of the document based on the result of the OCR process performed on the document image. Specifically, if the number of characters recognized in the pre-rotation OCR process at step S172 is equal to or greater than the number of characters recognized in the post-rotation OCR process at step S176, the estimation unit 205 estimates that the document orientation of the document is the readable orientation. If the number of characters recognized in the pre-rotation OCR process at step S172 is smaller than the number of characters recognized in the post-rotation OCR process at step S176, the estimation unit 205 estimates that the document orientation of the document is the unreadable orientation.

When the processes of steps S171 to S177 are completed, the scan setting estimation process proceeds to step S18 in FIG. 12.

At step S18, if the estimation unit 205 successfully estimates the document orientation of the document set on the ADF 960 (YES at step S18), the scan setting estimation process proceeds to step S19. If the estimation unit 205 fails to estimate the document orientation of the document (NO at step S18), the scan setting estimation process proceeds to step S20.

At step S19, the estimation unit 205 sets the estimated document orientation as the setting information of the scanning operation. As described above, the document orientation estimated by the estimation unit 205 is changeable on the scan setting screen 1100 illustrated in FIG. 11. Then, the scan setting estimation process proceeds to step S21.

At step S20, having failed to estimate the document orientation, the estimation unit 205 sets a default document orientation as the setting information of the scanning operation. As described above, the document orientation set by the estimation unit 205 is changeable on the scan setting screen 1100 illustrated in FIG. 11. Then, the scan setting estimation process proceeds to step S21.

At step S21, the estimation unit 205 of the information terminal 20 estimates the document color of the document set on the ADF 960 as the setting information of the scanning operation of the MFP 10 based on the document image cropped by the cropping unit 204. The estimation of the document color is performed as described above. Then, the scan setting estimation process proceeds to step S22.

At step S22, if the estimation unit 205 successfully estimates the document color of the document set on the ADF 960 (YES at step S22), the scan setting estimation process proceeds to step S23. If the estimation unit 205 fails to estimate the document color of the document (NO at step S22), the scan setting estimation process proceeds to step S24.

At step S23, the estimation unit 205 sets the estimated document color as the setting information of the scanning operation. As described above, the document color estimated by the estimation unit 205 is changeable on the scan setting screen 1100 illustrated in FIG. 11. Then, the scan setting estimation process is completed.

At step S24, having failed to estimate the document color, the estimation unit 205 sets a default document color as the setting information of the scanning operation. As described above, the document color set by the estimation unit 205 is changeable on the scan setting screen 1100 illustrated in FIG. 11. Then, the scan setting estimation process is completed.

The scan setting estimation process is performed in accordance with the above-described procedure of steps S11 to S24.

As described above, in the information terminal 20 of the first embodiment, the image capturing unit 202 captures the image of the ADF 960 of the MFP 10 with the document set on the ADF 960. The information acquisition unit 203 acquires the information related to the ADF 960 from the QR code 961 placed on the MFP 10. The estimation unit 205 estimates the setting information of the scanning operation of the MFP 10 based on the captured image of the ADF 960 captured by the image capturing unit 202 and the information acquired by the information acquisition unit 203. The scan instruction unit 207 instructs the MFP 10 to perform the scanning operation on the document based on the setting information estimated by the estimation unit 205. Thereby, the correct setting of the scanning operation is facilitated, and the burden on the user of performing an extra operation is reduced.

A second embodiment of the present invention will be described.

A description will be given of the information processing system 1 of the second embodiment, focusing on differences from the information processing system 1 of the first embodiment.

The above description of the first embodiment has been given of the configurations and operations to acquire the information related to the ADF 960, for example, by reading the QR code 961 placed on the ADF 960. In the second embodiment, a description will be given of configurations and operations to acquire the information related to the ADF 960, for example, by reading an NFC tag placed on the ADF 960. A general arrangement and a functional block configuration of the information processing system 1 of the second embodiment and a hardware configuration of the information terminal 20 of the second embodiment are similar to those described above in the first embodiment.

Figure 14:
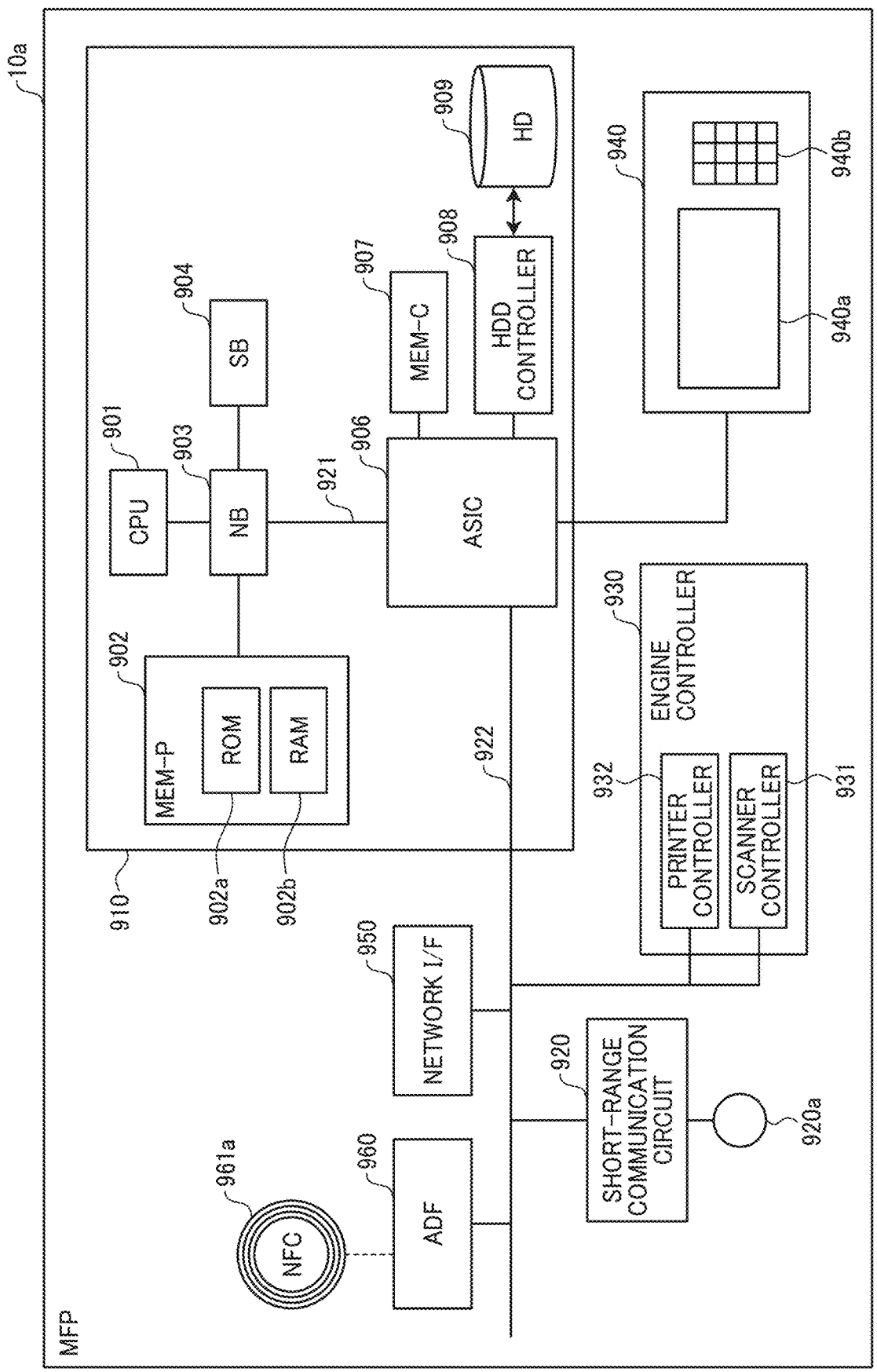
FIG. 14 is a diagram illustrating an exemplary hardware configuration of an MFP according to a second embodiment of the present invention.

FIG. 14 is a diagram illustrating an exemplary hardware configuration of an MFP 10*a* of the second embodiment. A hardware configuration of the MFP 10*a* of the second embodiment will be described with FIG. 14.

As illustrated in FIG. 14, the MFP 10*a* includes the controller 910, the short-range communication circuit 920, the engine controller 930, the operation panel 940, the network I/F 950, and the ADF 960.

The ADF 960 is equipped with an NFC tag 961*a* placed at a position allowing the reading of the NFC tag 961*a* by the information terminal 20. The NFC tag 961*a* is a tag (an example of the information medium) containing information (hereinafter occasionally referred to as the tag information) such as the IP address and the apparatus name of the MFP 10*a* and the actual size and the document reading direction (i.e., the vertical direction or the horizontal direction) of the ADF 960. The NFC tag 961*a* may be placed not on the ADP 960 but on a different part of the MFP 10*a*.

The other aspects of the configuration of the MFP 10*a* are similar to those of the MFP 10 of the first embodiment described above. The hardware configuration of the MFP 10*a* illustrated in FIG. 14 is illustrative. The MFP 10*a* is not necessarily required to include all of the components illustrated in FIG. 14. Further, the MFP 10*a* may include a component other than those illustrated in FIG. 14.

Figure 15:
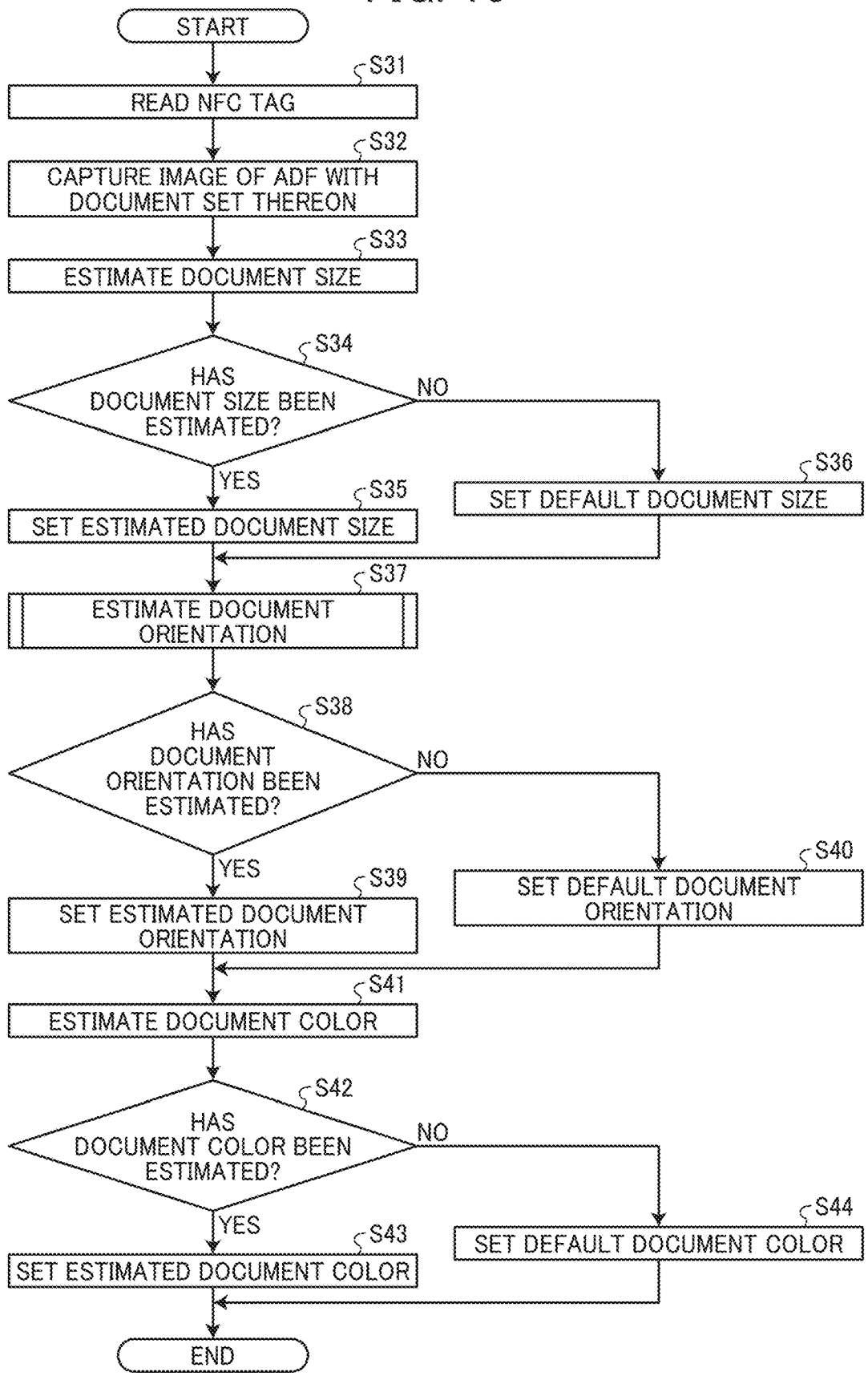
FIG. 15 is a flowchart illustrating an exemplary procedure of a scan setting estimation process preformed by the information terminal of the second embodiment.

FIG. 15 is a flowchart illustrating an exemplary procedure of a scan setting estimation process by the information terminal 20 of the second embodiment. A procedure of the scan setting estimation process by the information terminal 20 of the second embodiment will be described with FIG. 15.

At step S31, the user first moves the information terminal 20 close to the NFC tag 961*a* placed on the ADF 960 of the MFP 10*a*. Then, the short-range communication circuit 611 of the information terminal 20 communicates with the NFC tag 961*a* and receives the tag information contained in the NFC tag 961*a*. The information acquisition unit 203 of the information terminal 20 then acquires the tag information received by the short-range communication circuit 611. Then, the scan setting estimation process proceeds to step S32.

The processes of steps S32 to S44 are similar to the above-described processes of steps S12 to S24 illustrated in FIG. 12.

The scan setting estimation process is performed in accordance with the above-described procedure of steps S31 to S44.

As described above, in the information terminal 20 of the second embodiment, the information acquisition unit 203 acquires the information related to the ADF 960 from the NFC tag 961*a* placed on the MFP 10*a*. Thereby, the correct setting of the scanning operation is facilitated, and the burden on the user of performing an extra operation is reduced.

A third embodiment of the present invention will be described.

A description will be given of an information processing system 1*b* of the third embodiment, focusing on differences from the information processing system 1 of the first embodiment.

The above description of the first embodiment has been given of the configuration in which the functional units implemented through the execution of the scan application operate on the information terminal 20. In the third embodiment, a description will be given of a configuration in which part of the functional units implemented through the execution of the scan application operates on an external apparatus, not on an information terminal 20*b* of the third embodiment. Hardware configurations of the MFP 10 and the information terminal 20*b* of the third embodiment are similar to those described above in the first embodiment.

Figure 16:
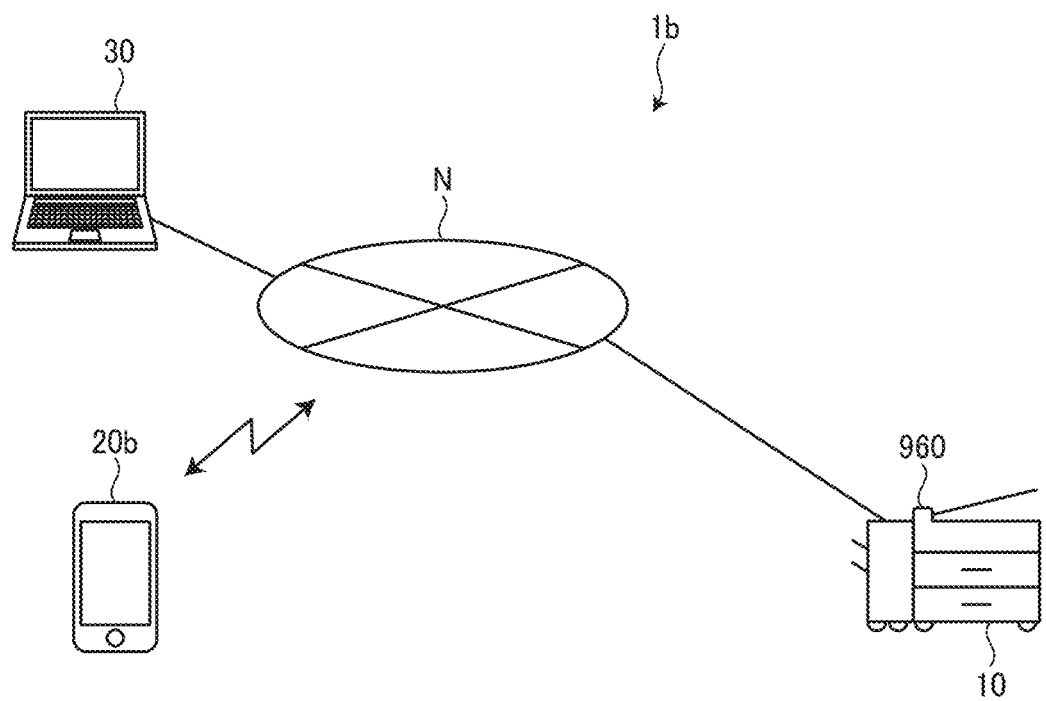
FIG. 16 is a diagram illustrating an exemplary general arrangement of an information processing system according to a third embodiment of the present invention.

FIG. 16 is a diagram illustrating an exemplary general arrangement of the information processing system 1*b* of the third embodiment. A general arrangement of the information processing system 1*b* of the third embodiment will be described with FIG. 16.

As illustrated in FIG. 16, the information processing system 1*b* includes the MFP 10, the information terminal 20*b* (an example of a first information processing apparatus), and a personal computer (PC) 30 (an example of a second information processing apparatus). The MFP 10, the information terminal 20*b*, and the PC 30 communicate data to each other via the network N.

The MFP 10 is an image forming apparatus (an example of the image reading apparatus) that performs the reading operation on the document set on the ADF 960 of the MFP 10 based on the setting information of the scanning operation estimated by the PC 30 with the captured image of the ADF 960 captured by the information terminal 20*b*.

The information terminal 20*b* is an information processing apparatus, such as a smartphone or a tablet terminal, that captures the image of the document set on the ADF 960, acquires the QR code information from the QR code 961 placed on the ADF 960, and transmits the captured image and the QR code information to the PC 30.

The PC 30 is an information processing apparatus that estimates the setting information of the scanning operation based on the captured image and the QR code information received from the information terminal 20*b*. The PC 30 is not limited to a PC and may be a workstation or a server apparatus. The hardware configuration of the PC 30 may be similar to the hardware configuration illustrated in FIG. 3.

Figure 17:
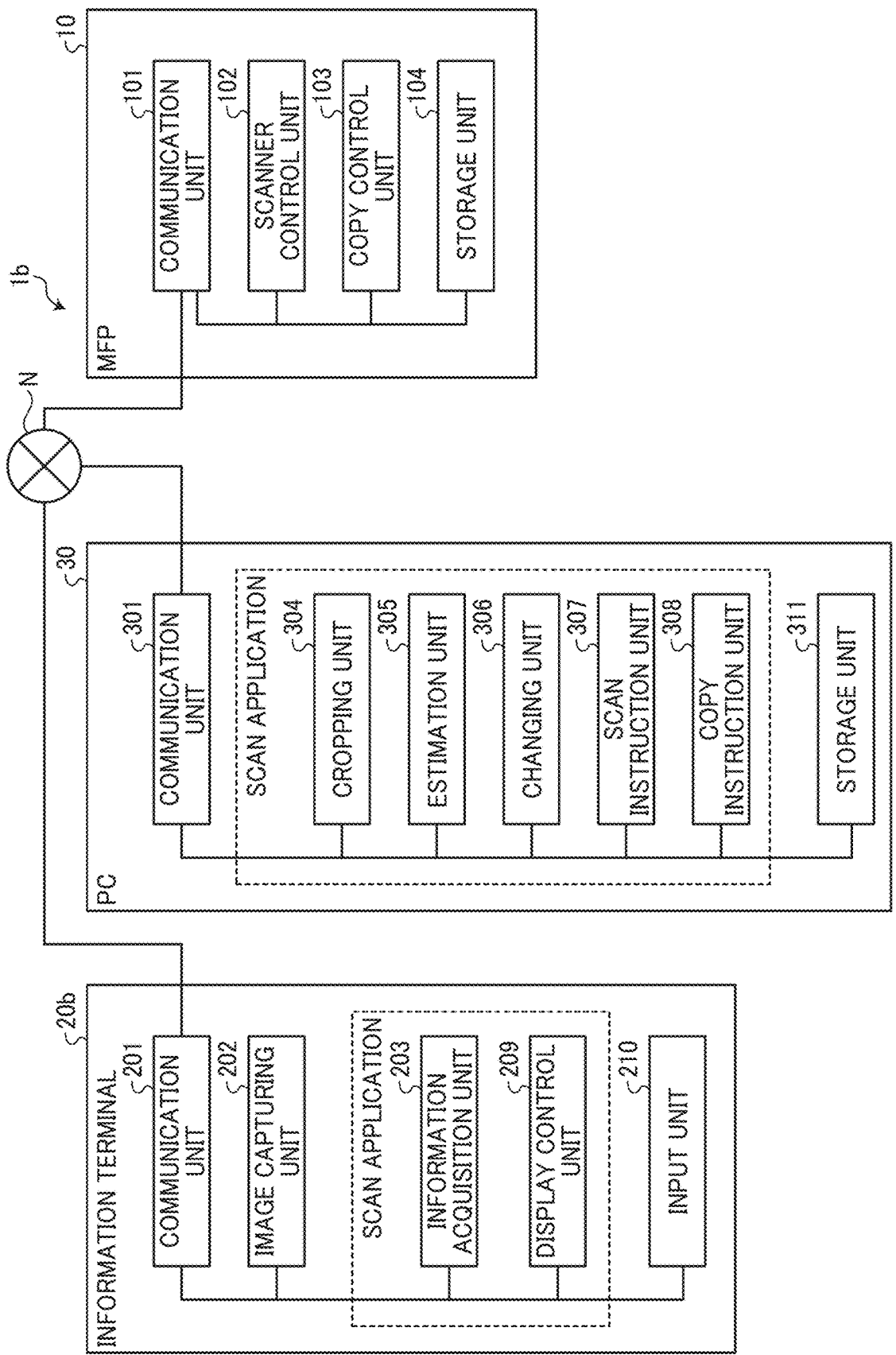
FIG. 17 is a diagram illustrating an exemplary configuration of functional blocks of the information processing system of the third embodiment.

FIG. 17 is a diagram illustrating an exemplary configuration of functional blocks of the information processing system 1*b* according to the third embodiment. Configurations and operations of the functional blocks of the information processing system 1*b* according to the third embodiment will be described with FIG. 17. Configurations and operations of the functional blocks of the MFP 10 according to the third embodiment are as described above with FIG. 4.

The information terminal 20*b* of the information processing system 1*b* includes the communication unit 201 (a transmitting unit), the image capturing unit 202, the information acquisition unit 203 (the acquisition unit), the display control unit 209, and the input unit 210. The display control unit 209 and the input unit 210 of the third embodiment are as described above with FIG. 4.

The communication unit 201 is a functional unit that preforms data communication with the PC 30. The communication unit 201 is implemented by the telecommunication circuit 610 and the antenna 610a illustrated in FIG. 3. The communication unit 201 may communicate with the PC 30 via the external device connection I/F 616 or the short-range communication circuit 611. In this case, the communication unit 201 does not need to perform the data communication with the PC 30 via the network N; the communication unit 201 does not need to be connected to the network N, to which the MFP 10 and the PC 30 are connected. For example, therefore, even if the information terminal 20b is a personal possession of the user and unable to access the network N, the information terminal 20b manages this situation.

The image capturing unit 202 is a functional unit that captures an image to obtain a captured image. In the third embodiment, the image capturing unit 202 captures the image of the ADF 960 of the MFP 10 with a document set on the ADF 960 to obtain a captured image. The captured image captured by the image capturing unit 202 is then transmitted to the PC 30 by the communication unit 201.

The information acquisition unit 203 detects the QR code 961 placed on the ADF 960 from the image captured by the image capturing unit 202 and decodes the detected QR code 961 to acquire the QR code information. The information acquisition unit 203 then transmits the acquired QR code information to the PC 30 via the communication unit 201.

The information acquisition unit 203 and the display control unit 209 described above are implemented by a program (e.g., a scan application running on the information terminal 20b) executed by the CPU 601 illustrated in FIG. 3. Part or all of these functional units may be implemented by a hardware circuit (e.g., an integrated circuit) such as an FPGA or an ASIC, instead of a program as software.

Each of the functional units of the information terminal 20b illustrated in FIG. 17 is a conceptual representation of a function, and is not limited to the configuration illustrated in FIG. 17. For example, a plurality of functional units illustrated in FIG. 17 as separate functional units of the information terminal 20b may be configured as a single functional unit. Further, the function of any of the functional units of the information terminal 20b illustrated in FIG. 17 may be divided into a plurality of functions to form a plurality of functional units.

The PC 30 of the information processing system 1b includes a communication unit 301 (a receiving unit), a cropping unit 304, an estimation unit 305, a changing unit 306, a scan instruction unit 307 (an instruction unit), a copy instruction unit 308, and a storage unit 311.

The communication unit 301 is a functional unit that preforms data communication with the MFP 10 or the information terminal 20b. The communication unit 301 is implemented by the telecommunication circuit 610 and the antenna 610a of the PC 30. The communication unit 301 may be implemented not by a wireless communication I/F but by a wired communication I/F.

The cropping unit 304 is a functional unit that crops the image of the document (i.e., the document image) from the captured image of the ADF 960 received by the communication unit 301.

The estimation unit 305 is a functional unit that estimates the setting information of the scanning operation of the MFP 10 based on the captured image of the ADF 960 received by the communication unit 301 and the information related to the ADF 960 included in the QR code information received by the communication unit 301. The estimation process by the estimation unit 305 to estimate the setting information of the scanning operation is similar to the above-described process by the estimation unit 205 of the information terminal 20 of the first embodiment.

The changing unit 306 is a functional unit that changes the setting information of the scanning operation, which includes the setting information estimated by the estimation unit 305 (e.g., the document size, the document orientation, and the document color), in accordance with the operation performed by the user.

The operations of the scan instruction unit 307, the copy instruction unit 308, and the storage unit 311 are similar to the above-described operations of the scan instruction unit 207, the copy instruction unit 208, and the storage unit 211 of the information terminal 20 according to the first embodiment. The storage unit 311 is implemented by at least one of the RAM 603 or the EEPROM 604 of the PC 30. In this case, the EEPROM 604 may be replaced by an HDD or an SSD.

The cropping unit 304, the estimation unit 305, the changing unit 306, the scan instruction unit 307, and the copy instruction unit 308 described above are implemented by a program (e.g., a scan application running on the PC 30) executed by the CPU 601 of the PC 30. Part or all of these functional units may be implemented by a hardware circuit (e.g., an integrated circuit) such as an FPGA or an ASIC, instead of a program as software.

Each of the functional units of the PC 30 illustrated in FIG. 17 is a conceptual representation of a function, and is not limited to the configuration illustrated in FIG. 17. For example, a plurality of functional units illustrated in FIG. 17 as separate functional units of the PC 30 may be configured as a single functional unit. Further, the function of any of the functional units of the PC 30 illustrated in FIG. 17 may be divided into a plurality of functions to form a plurality of functional units.

Figure 18:
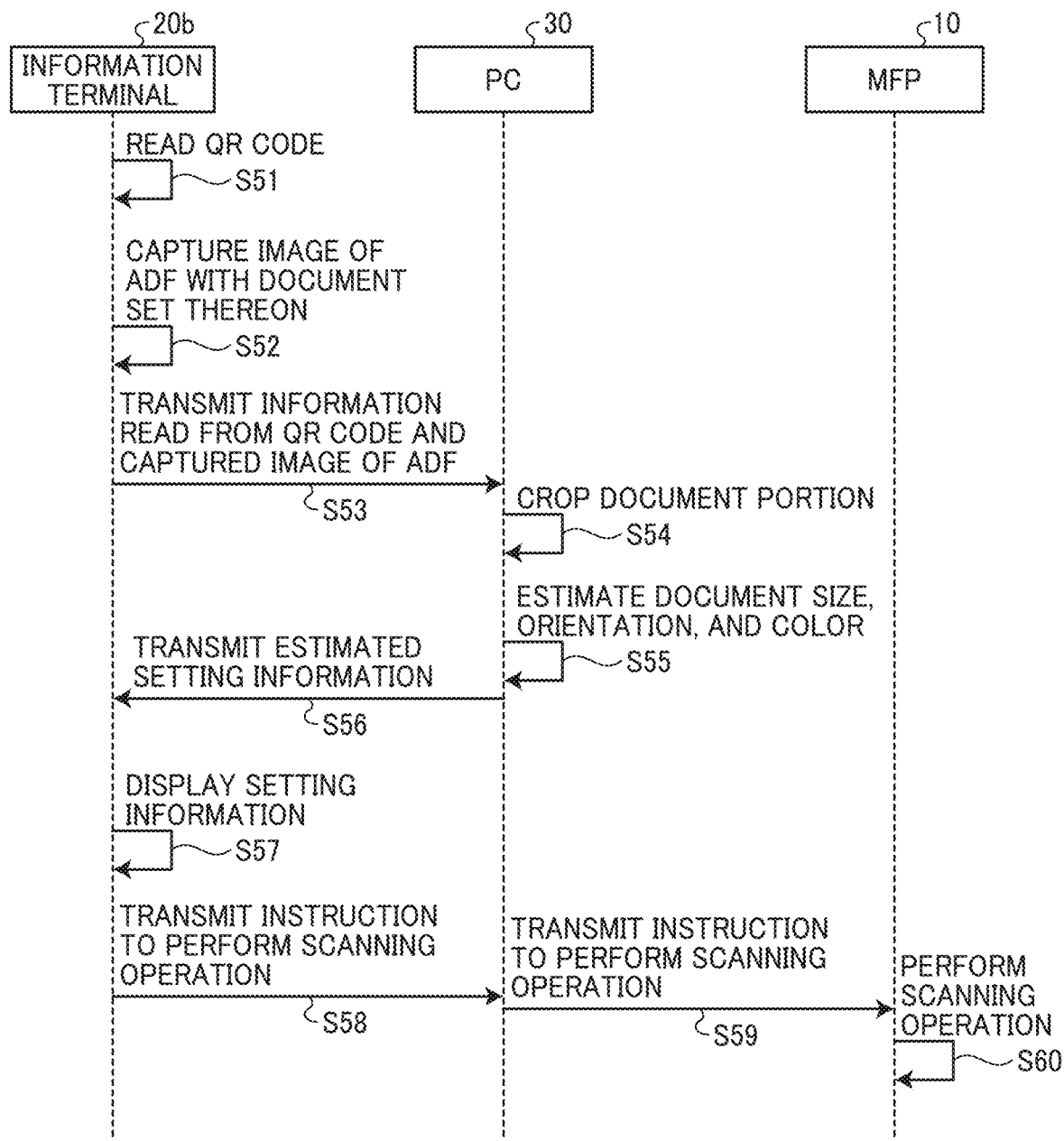
FIG. 18 is a sequence diagram illustrating an exemplary operation procedure of the information processing system of the third embodiment.

FIG. 18 is a sequence diagram illustrating an exemplary operation procedure of the information processing system 1b of the third embodiment. An operation procedure of the information processing system 1b of the third embodiment will be described with FIG. 18.

At step S51, the user first directs the image capturing unit 202 of the information terminal 20b to the QR code 961 placed on the ADF 960 of the MFP 10. Then, the information acquisition unit 203 of the information terminal 20b detects the QR code 961 placed on the ADF 960 from the image captured by the image capturing unit 202 and decodes (i.e., reads) the detected QR code 961 to acquire the QR code information.

At step S52, the user then sets a document on the ADF 960. Then, in accordance with an operation performed on the input unit 210 by the user, the display control unit 209 of the information terminal 20b causes the display 615 to display the shooting guide screen 1000 illustrated in FIG. 6. The user then presses (i.e., taps) the shutter button 1002 with the ADF 960 of the MFP 10 fitted in the shooting frame 1001 of the shooting guide screen 1000. Thereby, the image capturing unit 202 of the information terminal 20b captures the image of the ADF 960 with the document set thereon and obtains the captured image.

At step S53, the communication unit 201 transmits to the PC 30 the captured image captured by the image capturing unit 202 and the QR code information (i.e., the information read from the QR code 961) acquired by the information acquisition unit 203. Then, the communication unit 301 of the PC 30 receives the captured image and the QR code information.

At step S54, the cropping unit 304 of the PC 30 crops the document image of the document portion from the captured image received by the communication unit 301.

At step S55, the estimation unit 305 of the PC 30 estimates the setting information (e.g., the document size, the document orientation, and the document color) of the scanning operation of the MFP 10 based on the captured image of the ADF 960 received by the communication unit 301, the information related to the ADF 960 included in the QR code information received by the communication unit 301, and the document image cropped by the cropping unit 304.

At step S56, the estimation unit 305 transmits the setting information of the scanning operation, which includes the estimated setting information, to the information terminal 20b via the communication unit 301. Then, the communication unit 201 of the information terminal 20b receives the setting information.

At step S57, the display control unit 209 of the information terminal 20b displays the setting information of the scanning operation received by the communication unit 201 on the above-described scan setting screen 1100 illustrated in FIG. 11. The setting information may be changed as necessary by the user.

At step S58, when the user presses (i.e., taps) the "START SCAN" button 1103 of the scan setting screen 1100, the communication unit 201 transmits to the PC 30 an instruction to the MFP 10 to perform the scanning operation on the document and the setting information of the scanning operation. Then, the communication unit 301 of the PC 30 receives the instruction to perform the scanning operation and the setting information. The setting information of the scanning operation is already held by the PC 30, and thus the process of transmitting the setting information to the PC 30 may be skipped here.

At step S59, in accordance with the instruction to perform the scanning operation received by the communication unit 301, the scan instruction unit 307 of the PC 30 instructs the MFP 10 to perform the scanning operation on the document based on the setting information received by the communication unit 301.

At step S60, in response to receipt of the instruction from the PC 30 to perform the scanning operation, the scanner control unit 102 of the MFP 10 causes the scanner controller 931 to perform the scanning operation on the document fed by the ADF 960 with the received setting information of the scanning operation.

The operation of the information processing system 1b is performed in accordance with the above-described procedure of steps S51 to S60. The setting information of the scanning operation estimated by the PC 30 is transmitted to and displayed on the information terminal 20b, as described above. However, the display of the setting information of the scanning operation is not limited thereto. The PC 30 may display the setting information of the scanning operation and issue the instruction to perform the scanning operation.

As described above, in the information processing system 1b of the third embodiment, the image capturing unit 202 of the information terminal 20b captures the image of the ADF 960 of the MFP 10 with the document set on the ADF 960. The information acquisition unit 203 of the information terminal 20b acquires the information related to the ADF 960 from the QR code 961 placed on the MFP 10. The communication unit 201 of the information terminal 20b transmits to the PC 30 the captured image of the ADF 960 captured by the image capturing unit 202 and the information acquired by the information acquisition unit 203. The communication unit 301 of the PC 30 receives the captured image and the information related to the ADF 960 transmitted from the communication unit 201. The estimation unit 305 of the PC 30 estimates the setting information of the scanning operation of the MFP 10 based on the captured image and the information related to the ADF 960 received by the communication unit 301. The scan instruction unit 307 of the PC 30 instructs the MFP 10 to perform the scanning operation on the document based on the setting information estimated by the estimation unit 305. Thereby, the correct setting of the scanning operation is facilitated, and the burden on the user of performing an extra operation is reduced. Further, even if the information terminal 20b is a personal possession of the user and unable to connect to the network N, to which the MFP 10 is connected, for example, the information terminal 20b manages this situation while satisfying security requirements.

In each of the foregoing embodiments, when at least one of the functions of the MFP 10 or 10a, the information terminal 20 or 20b, or the PC 30 is implemented by the execution of a program, the program is provided as previously recorded on a storage device such as a ROM. In each of the embodiments, a program executed on the MFP 10 or 10a, the information terminal 20 or 20b, or the PC 30 may be provided as recorded on a computer readable recording medium, such as a CD-ROM, a flexible disk (FD), a CD-R, or a DVD, in an installable or executable file format. Further, in each of the embodiments, the program executed on the MFP 10 or 10a, the information terminal 20 or 20b, or the PC 30 may be stored in a computer connected to a network such as the Internet and be provided as downloaded via the network, or may be provided or distributed via a network such as the Internet. Further, in each of the embodiments, the program executed on the MFP 10 or 10a, the information terminal 20 or 20b, or the PC 30 is configured as a module including at least one of the above-described functional units. As an actual hardware configuration, a CPU reads and executes the program from the above-described storage device, thereby loading and generating the least one of the functional units on a main storage device.

The present disclosure relates to the following aspects.

According to a first aspect, an information processing apparatus includes an image capturing unit, an acquisition unit, an estimation unit, and a first instruction unit. The image capturing unit captures an image of an automatic document feeder of an image reading apparatus with a document set on the automatic document feeder. The acquisition unit acquires information related to the automatic document feeder from an information medium placed on the image reading apparatus. Based on the captured image of the automatic document feeder captured by the image capturing unit and the information acquired by the acquisition unit, the estimation unit estimates setting information of a reading operation performed by the image reading apparatus. The first instruction unit instructs the image reading apparatus to perform the reading operation on the document based on the setting information estimated by the estimation unit.

According to a second aspect, in the information processing apparatus of the first aspect, the setting information estimated by the estimation unit includes a document size of the document, a document orientation of the document set on the automatic document feeder, and a document color of the document.

According to a third aspect, the information processing apparatus of the second aspect further includes a cropping unit that crops an image of the document from the captured image to obtain a document image. The estimation unit estimates the document orientation and the document color based on the document image cropped by the cropping unit.

According to a fourth aspect, the information processing apparatus of one of the first to third aspects further includes a display control unit that causes a display device to display the setting information estimated by the estimation unit and different setting information from the estimated setting information as setting candidates.

According to a fifth aspect, in the information processing apparatus of one of the first to fourth aspects, the information medium is a two-dimensional code in which the information related to the automatic document feeder is encoded.

According to a sixth aspect, in the information processing apparatus of one of the first to fourth aspects, the information medium is a near field communication (NFC) tag containing the information related to the automatic document feeder.

According to a seventh aspect, the information processing apparatus of one of the first to sixth aspects further includes a changing unit that changes the setting information estimated by the estimation unit in accordance with an operation performed on the information processing apparatus.

According to an eighth aspect, the information processing apparatus of one of the first to seventh aspects further includes a display control unit that causes a display device to display guide information for guiding a user to capture the image of the automatic document feeder with the image capturing unit.

According to a ninth aspect, in the information processing apparatus of one of the first to eighth aspects, the image reading apparatus is an image forming apparatus with a reading function to read the document and a printing function to print a copy based on an image of the read document. The information processing apparatus further includes a second instruction unit that instructs the image reading apparatus to perform a copying operation on the document based on the setting information estimated by the estimation unit.

According to a tenth aspect, an information processing system includes a first information processing apparatus and a second information processing apparatus. The first information processing apparatus includes an image capturing unit, an acquisition unit, and a transmitting unit. The image capturing unit captures an image of an automatic document feeder of an image reading apparatus with a document set on the automatic document feeder. The acquisition unit acquires information related to the automatic document feeder from an information medium placed on the image reading apparatus. The transmitting unit transmits the captured image of the automatic document feeder captured by the image capturing unit and the information acquired by the acquisition unit to the second information processing apparatus. The second information processing apparatus includes a receiving unit, an estimation unit, and an instruction unit. The receiving unit receives the captured image and the acquired information transmitted by the transmitting unit. Based on the captured image and the acquired information received by the receiving unit, the estimation unit estimates setting information of a reading operation performed by the image reading apparatus. The instruction unit instructs the image reading apparatus to perform the reading operation on the document based on the setting information estimated by the estimation unit.

According to an eleventh aspect, an information processing method includes capturing an image of an automatic document feeder of an image reading apparatus with a document set on the automatic document feeder, acquiring information related to the automatic document feeder from an information medium placed on the image reading apparatus, estimating setting information of a reading operation performed by the image reading apparatus based on the captured image of the automatic document feeder and the acquired information, and instructing the image reading apparatus to perform the reading operation on the document based on the estimated setting information.

According to a twelfth aspect, a non-transitory recording medium stores a plurality of instructions which, when executed by one or more processors, causes the one or more processors to perform an information processing method. The information processing method includes capturing an image of an automatic document feeder of an image reading apparatus with a document set on the automatic document feeder, acquiring information related to the automatic document feeder from an information medium placed on the image reading apparatus, estimating setting information of a reading operation performed by the image reading apparatus based on the captured image of the automatic document feeder and the acquired information, and instructing the image reading apparatus to perform the reading operation on the document based on the estimated setting information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
an image sensor to capture an image of an automatic document feeder of an image reading apparatus with a document set on the automatic document feeder; and
circuitry configured to
acquire information related to the automatic document feeder from an information medium placed on the image reading apparatus,
based on the captured image of the automatic document feeder and the acquired information, estimate setting information of a reading operation performed by the image reading apparatus, and
instruct the image reading apparatus to perform the reading operation on the document based on the estimated setting information.

2. The information processing apparatus of claim 1, wherein the estimated setting information includes a document size of the document, a document orientation of the document set on the automatic document feeder, and a document color of the document.

3. The information processing apparatus of claim 2, wherein the circuitry further
crops an image of the document from the captured image to obtain a document image, and
estimates the document orientation and the document color based on the obtained document image.

4. The information processing apparatus of claim 1, wherein the circuitry further causes a display to display the estimated setting information and different setting information from the estimated setting information as setting candidates.

5. The information processing apparatus of claim 1, wherein the information medium is a two-dimensional code in which the information related to the automatic document feeder is encoded.

6. The information processing apparatus of claim 1, wherein the information medium is a near field communication tag containing the information related to the automatic document feeder.

7. The information processing apparatus of claim 1, wherein the circuitry further changes the estimated setting information in accordance with an operation performed on the information processing apparatus.

8. The information processing apparatus of claim 1, wherein the circuitry further causes a display to display guide information for guiding a user to capture the image of the automatic document feeder with the image sensor.

9. The information processing apparatus of claim 1, wherein the image reading apparatus is an image forming apparatus with a scanner that reads the document and a printer that prints a copy based on an image of the read image, and
wherein the circuitry instructs the image reading apparatus to perform a copying operation on the document based on the estimated setting information.

10. An information processing system comprising:
an image sensor to capture an image of an automatic document feeder of an image reading apparatus with a document set on the automatic document feeder;
a first information processing apparatus including first circuitry; and
a second information processing apparatus including second circuitry,
the first circuitry being configured to
acquire information related to the automatic document feeder from an information medium placed on the image reading apparatus, and
transmit the captured image of the automatic document feeder and the acquired information to the second information processing apparatus, and
the second circuitry being configured to
receive the transmitted captured image and acquired information,
based on the received captured image and acquired information, estimate setting information of a reading operation performed by the image reading apparatus, and
instruct the image reading apparatus to perform the reading operation on the document based on the estimated setting information.

11. An information processing method comprising:
capturing an image of an automatic document feeder of an image reading apparatus with a document set on the automatic document feeder;
acquiring information related to the automatic document feeder from an information medium placed on the image reading apparatus;
based on the captured image of the automatic document feeder and the acquired information, estimating setting information of a reading operation performed by the image reading apparatus; and
instructing the image reading apparatus to perform the reading operation on the document based on the estimated setting information.

12. A non-transitory recording medium storing a plurality of instructions which, when executed by one or more processors, causes the one or more processors to perform an information processing method comprising:
capturing an image of an automatic document feeder of an image reading apparatus with a document set on the automatic document feeder;
acquiring information related to the automatic document feeder from an information medium placed on the image reading apparatus;
based on the captured image of the automatic document feeder and the acquired information, estimating setting information of a reading operation performed by the image reading apparatus; and
instructing the image reading apparatus to perform the reading operation on the document based on the estimated setting information.

* * * * *